United States Patent [19]
Takahashi

[11] Patent Number: 5,890,574
[45] Date of Patent: Apr. 6, 1999

[54] HYDRAULIC COUPLING ARRANGEMENT FOR 4WD VEHICLE

[75] Inventor: Hisayuki Takahashi, Kawasaki, Japan

[73] Assignee: Isuzu Motors Limited, Tokyo, Japan

[21] Appl. No.: 804,499

[22] Filed: Feb. 21, 1997

[30] Foreign Application Priority Data

Feb. 29, 1996 [JP] Japan .................................. 8-043634

[51] Int. Cl.⁶ .................................................. B60K 17/348
[52] U.S. Cl. ................... 192/35; 192/85 AA; 192/103 F
[58] Field of Search ................................ 192/35, 85 AA, 192/103 F, 58.42; 180/249

[56] References Cited

U.S. PATENT DOCUMENTS

| | | | |
|---|---|---|---|
| 4,719,998 | 1/1988 | Hiramatsu et al. ............. | 192/103 F X |
| 4,727,966 | 3/1988 | Hiramatsu et al. ............. | 192/103 F X |
| 4,817,751 | 4/1989 | Asano et al. .................... | 192/103 F X |
| 5,194,053 | 3/1993 | Sano et al. ...................... | 192/103 F X |

FOREIGN PATENT DOCUMENTS

| | | |
|---|---|---|
| 60-252026 | 12/1985 | Japan . |
| 1-250662 | 10/1989 | Japan . |
| 3-266726 | 11/1991 | Japan . |

OTHER PUBLICATIONS

English abstract translation attached to each of the above–identified Japanese documents.

*Primary Examiner*—Rodney H. Bonck
*Attorney, Agent, or Firm*—McCormick, Paulding & Huber

[57] ABSTRACT

A hydraulic coupling arrangement used for a 4WD vehicle for imparting a drive torque of an engine to auxiliary drive wheels based on a first rotational difference between main and auxiliary drive wheels. A first rotary shaft is coupled to the main drive wheel and a second rotary shaft is coupled to the auxiliary drive wheel. A hydraulic pump of the coupling arrangement is adapted to be driven according to a second rotational difference between the first and second rotary shafts for generating an oil pressure corresponding to the second rotational difference. A clutch connects the first rotary shaft with the second rotary shaft based on the oil pressure generated by the hydraulic pump. A first oil passage extends to the clutch. First and second ports are formed in the hydraulic pump and function as inlet and outlet ports or vice versa based on the second rotational difference and a rotational direction of the first rotary shaft. One of the ports is communicated with the first oil passage and the other port is communicated with an oil chamber defined in the coupling arrangement for normally holding the working oil.

25 Claims, 15 Drawing Sheets

FIG. 17
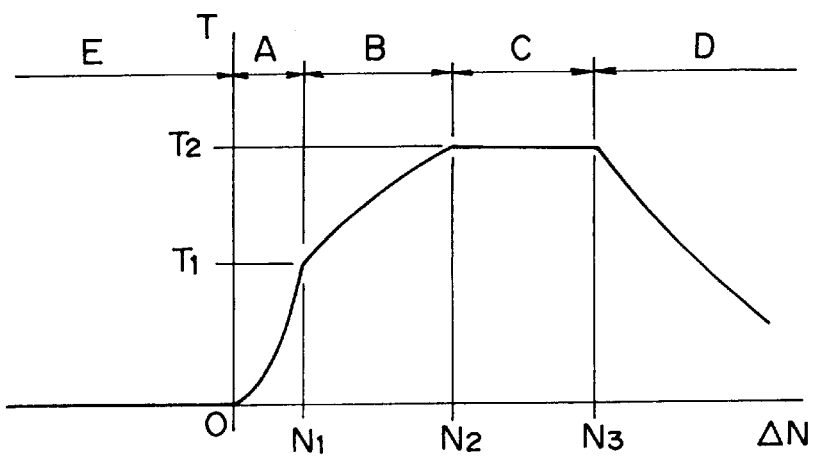
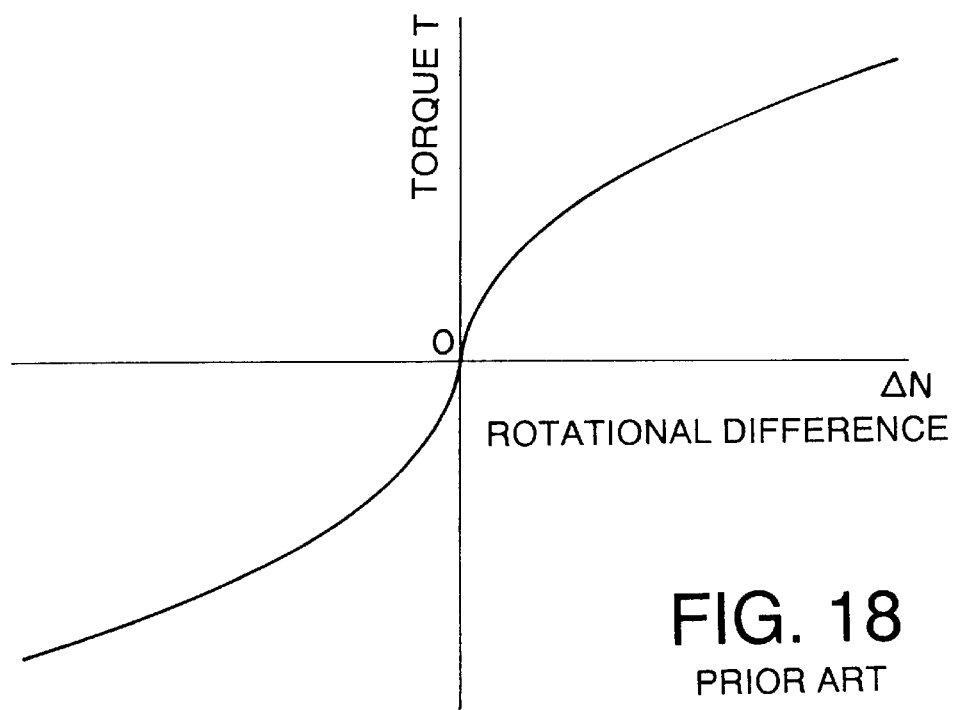
FIG. 18
PRIOR ART

HYDRAULIC COUPLING ARRANGEMENT FOR 4WD VEHICLE

BACKGROUND OF THE INVENTION

1. Technical Field

The present invention relates to a differential responsive hydraulic coupling arrangement for a 4WD vehicle, and more particularly to such a hydraulic coupling arrangement which takes advantage of a rotational difference between main or primary drive wheels (for example, rear wheels) of a vehicle and auxiliary or secondary drive wheels (for example, front wheels) to automatically switch a vehicle's drive condition from 2WD to 4WD.

2. Background Art

Generally a drive power from an engine of a vehicle is directly transmitted to main drive wheels to only drive the main drive wheels if the vehicle has just a 2WD mode. If the vehicle is a 4WD car, the vehicle is usually equipped with a coupling arrangement which has a following function and is particularly useful when running on a slippery road. When there is slippage or idle running between the main drive wheels and a snowy or slippery road which has a low friction coefficient, the drive power of the engine of the 4WD vehicle is also transmitted to auxiliary drive wheels. Since the drive power of the engine is transmitted to both the main and auxiliary drive wheels under a certain circumstance; this is the automatic switching of a drive mode from 2WD to 4WD. A typical example of this type of coupling arrangement is a differential responsive one which takes advantage of rotational difference between the primary and secondary drive wheels. One of the prevailing coupling arrangements of this differential responsive type is a viscous coupling arrangement which utilizes a high viscosity fluid.

The viscous coupling arrangement is easy to handle in a normal range (i.e., when there is an adequate rotational difference between main (rear) and auxiliary (front) drive wheels) since a torque transmitted to the auxiliary drive wheels rises gradually in such a range. However, the transmitted torque rises steeply in a range of very small rotational difference so that a torque more than necessary is frequently transmitted to the auxiliary drive wheels. It is caused, for example, even when the vehicle is running on an ordinary or general road of which surface has a certain size of concaves and convexes and a small rotational difference is generated between the front and rear drive wheels due to such small concaves and/or convexes. This results in a heat loss in a power transmission line for the auxiliary drive wheels since heat is unnecessarily generated upon unnecessary torque transmission to the auxiliary drive wheels and therefore this also results in a deteriorated fuel consumption rate. In addition, when the vehicle turns right or left, a "tight corner braking phenomenon" is significantly observed if the vehicle is provided with the viscous coupling arrangement. Furthermore, when a large rotational difference is created between the main and auxiliary drive wheels by a driver depressing an accelerator pedal, a large torque is transferred to the auxiliary drive wheels so that parts and components of a power transmission line should have particular strength and rigidity to cope with such high torque transmission.

Another example of the well known differential responsive coupling arrangements is a hydraulic coupling arrangement which is disclosed, for instance, in Japanese Patent Application, Publication No. 60-252026, the entire disclosure thereof is incorporated herein by reference. This hydraulic coupling arrangement uses the rotational difference between the main and auxiliary drive wheels to drive a hydraulic pump and engages or couples a clutch to connect the main and auxiliary drive wheels with each other thereby switching the drive condition from 2WD to 4WD. If there is no slippage between a road and the main drive wheels and there is no rotational difference between the main and auxiliary drive wheels, the hydraulic pump is not actuated and the clutch is not coupled so that the vehicle is operated in a 2WD condition. Therefore, the vehicle runs in a 4WD condition only when there is slippage between the road and the main drive wheels. In other words, the automatic drive mode switching from 2WD to 4WD only occurs when it is necessary.

As described in Japanese Patent Application Publication No. 60-252026, the hydraulic coupling arrangement has a torque transmission characteristic which is proportional to square of rotational difference. This characteristic is obtained by discharging through an orifice a part of an oil (or oil pressure) delivered from a hydraulic pump. This is especially effective in a range of very small rotational difference since it suppresses increase of the transmitted torque in this range. In other words, the hydraulic coupling arrangement does not have a drawback which the viscous coupling arrangement has. In addition, if a relief valve is provided in a hydraulic line, an upper limit or rise-up of the transmitted torque is determined or controlled, i.e., the relief valve functions as a torque limiter. Such a relief valve can prevent a high torque transmission to the auxiliary drive wheels so that the parts and components of a power transmission line related to the torque transmission to the auxiliary drive wheels may be reduced and/or simplified.

In the hydraulic coupling arrangement disclosed in the above-mentioned Japanese publication, however, the clutch is set to an engaged condition both when the main drive wheels are rotated at a higher speed than the auxiliary drive wheels and when the auxiliary drive wheels are rotated at a higher speed than the main drive wheels, so as to always switch to the 4WD mode upon rotational difference between the main and auxiliary drive wheels. This causes the following problem: when a vehicle turns right or left, the "tight corner braking phenomenon" occurs upon generation of rotational difference between the main and auxiliary drive wheels which is caused by different running routes of the front and rear drive wheels of the turning vehicle. The "tight corner braking phenomenon" prevents a smooth turning of the vehicle.

When the vehicle moves backward, the hydraulic pump is operated in a reverse direction. The coupling arrangement also brings the clutch in the engaged condition when the vehicle tries to make a right or left turn while it is moving backward. A smooth turning cannot be expected for the same reasons as mentioned above.

Other prior art arrangements are disclosed in, for example, Japanese Patent Application, Publication Nos. 1-250662 and 3-266726.

SUMMARY OF THE INVENTION

One object of the present invention is to provide a hydraulic coupling arrangement for a 4WD vehicle which can eliminate the above described problems.

Another object of the present invention is to provide a hydraulic coupling arrangement for a 4WD vehicle which insures a smooth turning of the vehicle both when the vehicle moves forward and when backward.

According to one aspect of the present invention, there is provided a hydraulic coupling arrangement used for a 4WD vehicle for imparting a drive power or torque, which is normally applied to main drive wheels only, to auxiliary drive wheels based on a first rotational difference between the main and auxiliary drive wheels, comprising: a first rotary shaft coupled to the main drive wheels; a second rotary shaft coupled to the auxiliary drive wheels; a hydraulic pump adapted to be driven according to a second rotational difference between the first and second rotary shafts for generating an oil pressure corresponding to the second rotational difference; a clutch for connecting the first rotary shaft with the second rotary shaft based on the oil pressure generated by the hydraulic pump; a first oil passage extending to the clutch; and first and second ports formed in the hydraulic pump and functioning as inlet and outlet ports or vice versa based on the second rotational difference. One of the ports is communicated with the first oil passage and the other port is communicated with an oil chamber defined in the coupling arrangement for impounding or holding the working oil under an atmospheric pressure.

The first and second ports serve as the inlet and outlet ports in one occasion and serve as the outlet and inlet ports in another occasion depending upon the rotational difference between the first and second rotary shafts. When the vehicle moves forward and the main drive wheels rotate faster than the auxiliary drive wheels, the outlet port is connected with the oil passage whereas the inlet port is connected with the oil chamber so that the clutch is set to an engaged condition. In the opposite situation, the outlet portion is connected with the oil chamber whereas the inlet portion is connected with the oil passage so that the oil pressure applied to the clutch is released to bring the clutch into a disengaged condition thereby allowing the auxiliary drive wheels to rotate freely or setting a drive mode to 2WD.

Therefore, the vehicle makes a turn with the front and rear drive wheels having different rotational speeds, the tight corner braking phenomenon is prevented and a smooth cornering of the vehicle is ensured.

The hydraulic coupling arrangement may further include port switching means for switching the first and second ports based on a moving direction (i.e., forward or backward) of the vehicle. It should be noted that the rotational direction of the first and second rotary shafts (these shafts rotate in the same direction) coincides with the moving direction of the vehicle.

Generally, the first port is switched to the inlet port from the outlet port and the second portion is switched to the outlet port from the inlet port upon change of the rotational direction of the first and second rotary shafts. If there were not for the port switching means and the vehicle moved backward, the outlet port would be communicated to the oil chamber and the inlet port would be communicated to the oil passage like the foregoing situation as when the auxiliary drive wheels rotate faster. In the present invention, however, the port switching means changes the role of the first and second ports so that the outlet port is communicated to the oil passage and the inlet port is communicated to the oil chamber like when the main drive wheels rotate faster. This makes it possible to maintain the drive mode of the vehicle in 4WD when the vehicle moves backward so that a necessary drive power is exerted.

If the auxiliary drive wheels rotate faster than the main drive wheels in this situation (i.e., when the vehicle turns while it is moving backward), the outlet port connects to the oil chamber so that the oil pressure applied to the clutch is released and the auxiliary drive wheels are allowed to rotate freely. Accordingly, the vehicle is switched to a 2WD mode and a smooth turning is ensured.

The hydraulic coupling arrangement may further include a check valve which is opened by a negative pressure generated in the inlet port when the second rotary shaft rotates faster than the first rotary shaft, for communicating the first oil passage with the oil chamber. It should be noted that according to a prior art, when the auxiliary drive wheels rotate faster than the main drive wheels, the oil passage is connected with the inlet port so that the oil passage has a negative pressure. This results in generation of cavitation in the oil passage and/or meaningless or wasteful movement of the hydraulic pump. According to the present invention, however, such problems are prevented by the check valve.

These and other objects and advantages of the hydraulic coupling arrangement of the present invention will become more apparent as the following detailed description and the appended claims are read and understood with the accompanying drawings.

BRIEF DESCRIPTION OF THE ACCOMPANYING DRAWINGS

Figure 1:
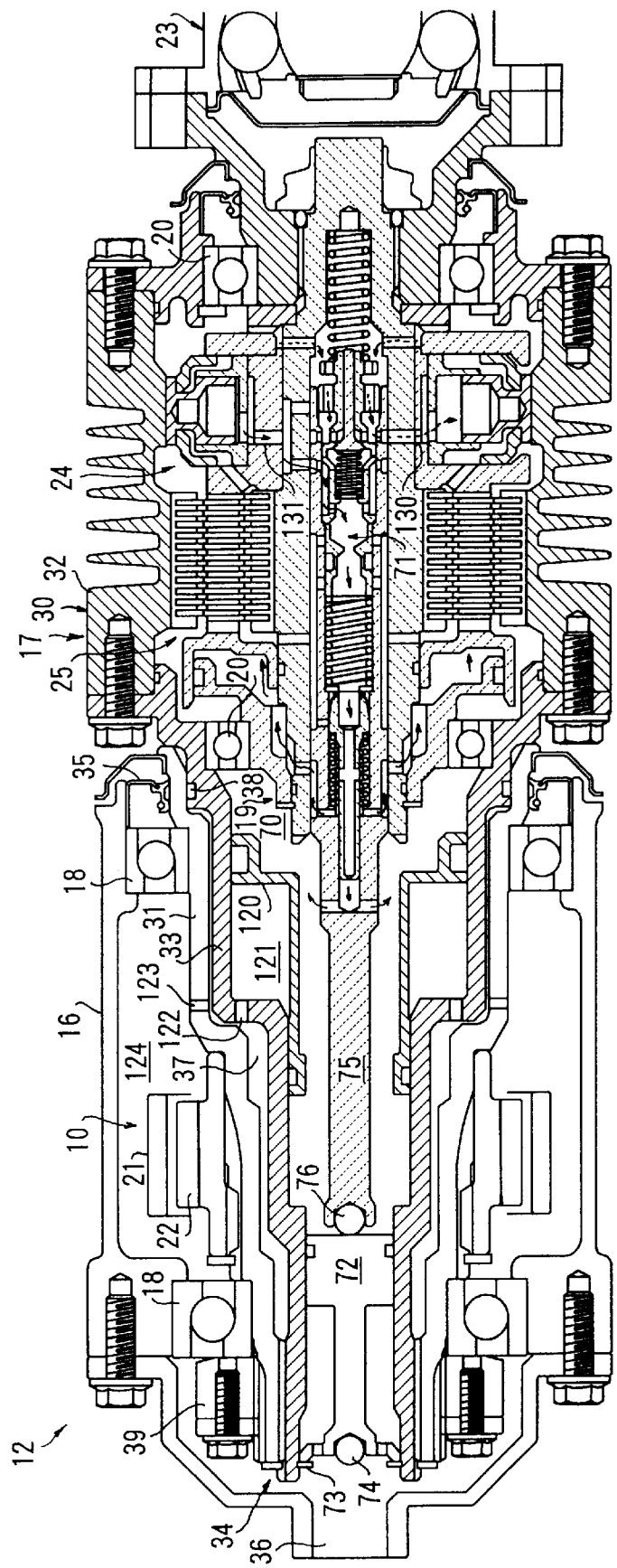
FIG. 1 is a front sectional view of a hydraulic coupling arrangement according to the present invention, which particularly illustrates routes for a working oil when a rotational difference between front and rear wheels of a vehicle is relatively small (zone A in FIG. 17)
Figure 7A:
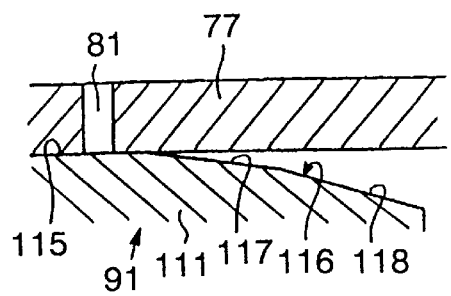
Figure 7B:
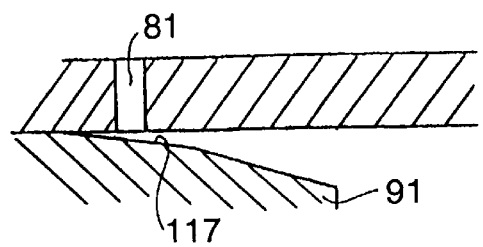
Figure 7C:
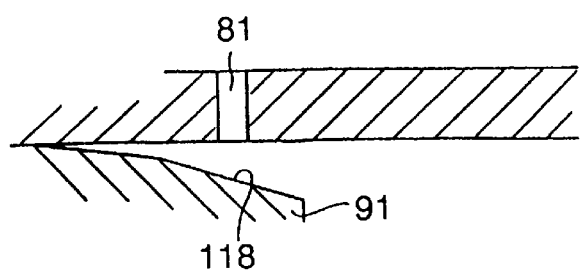
Figure 8:
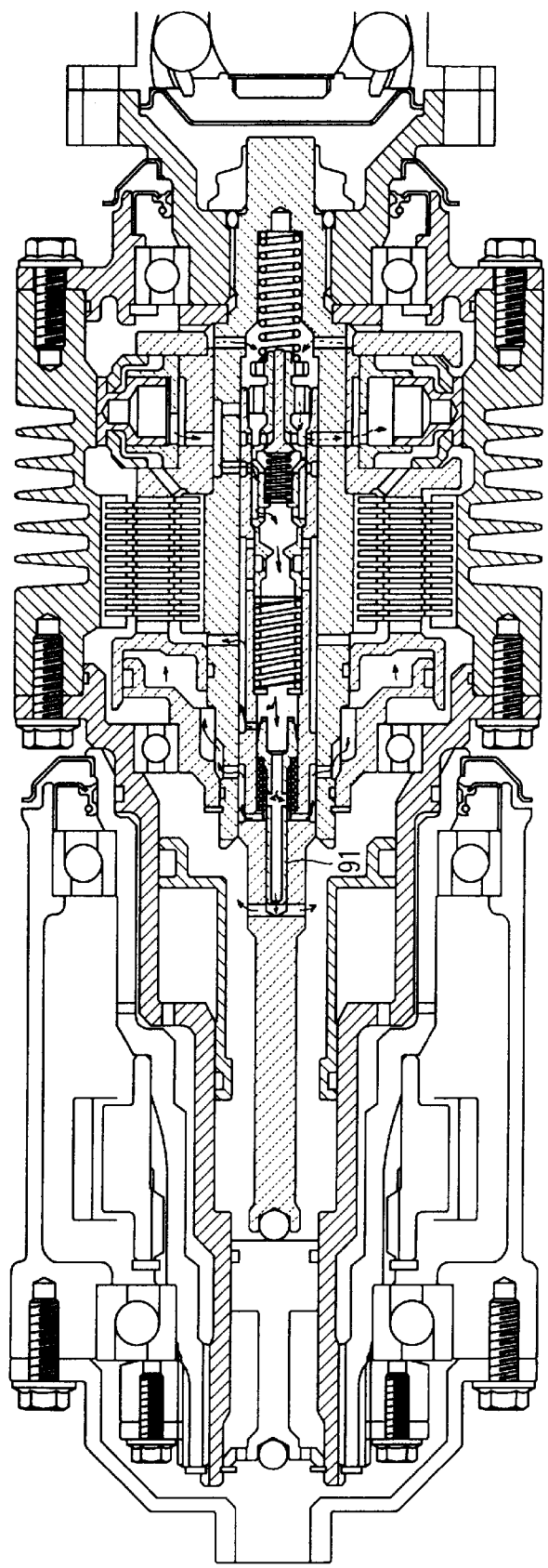
Figure 9:
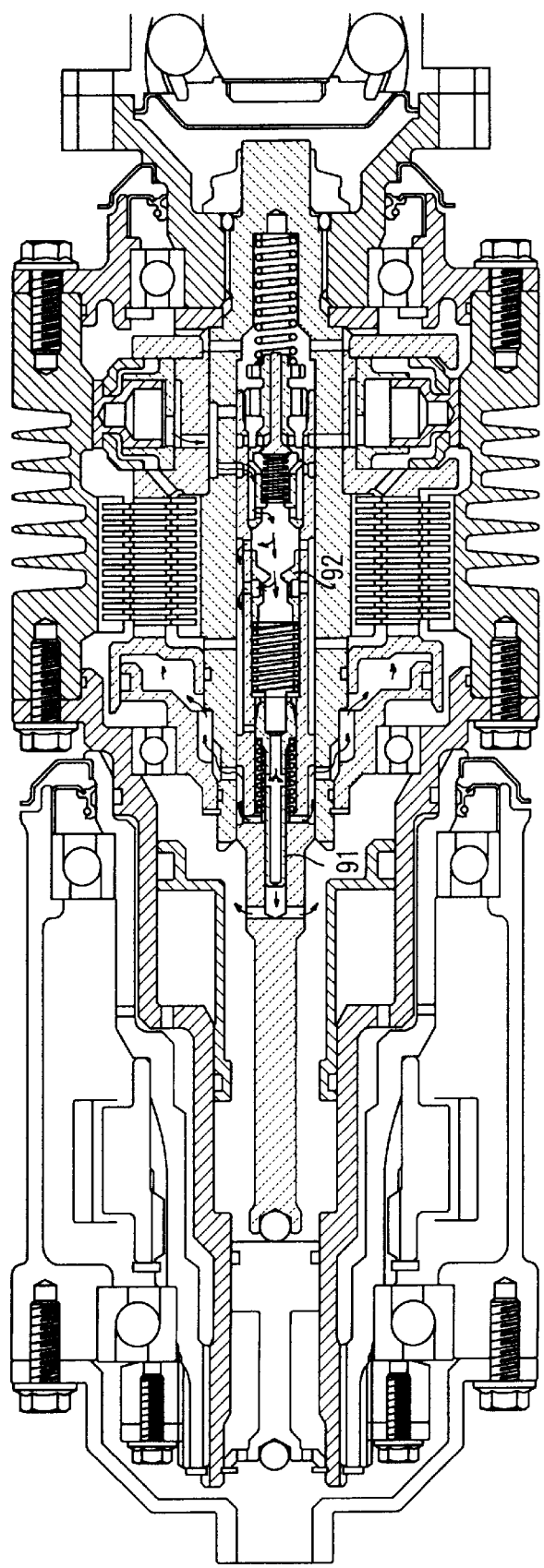
Figure 10:
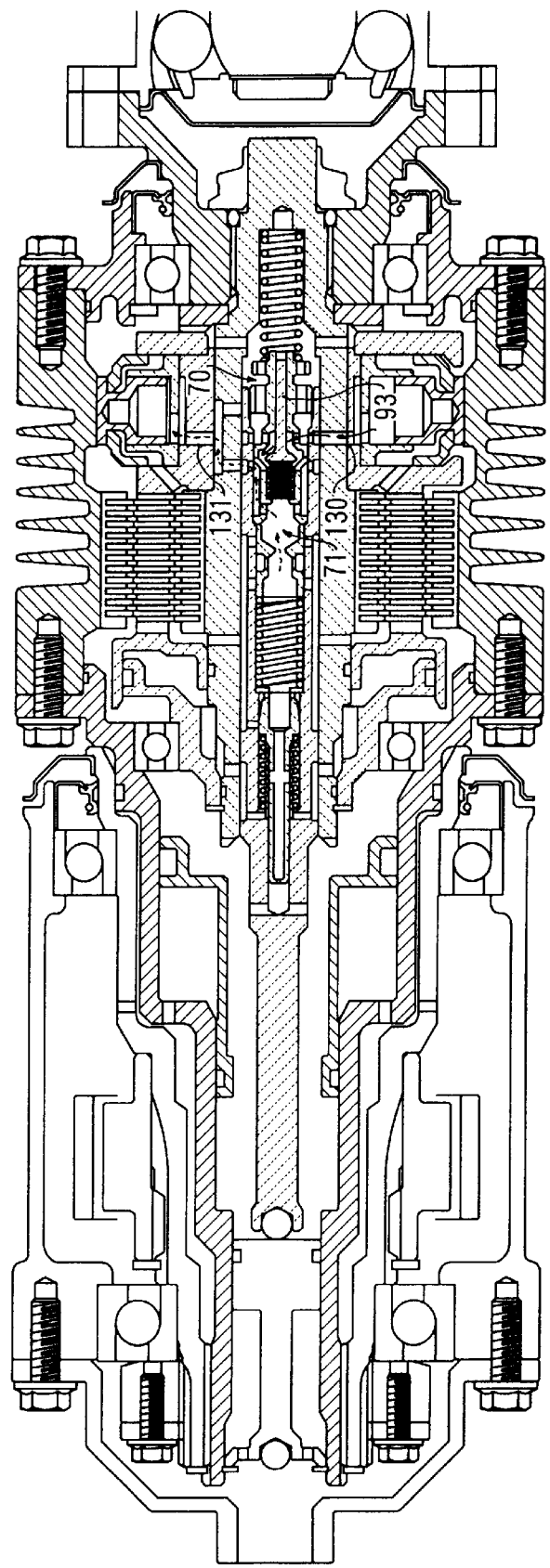
Figure 11:
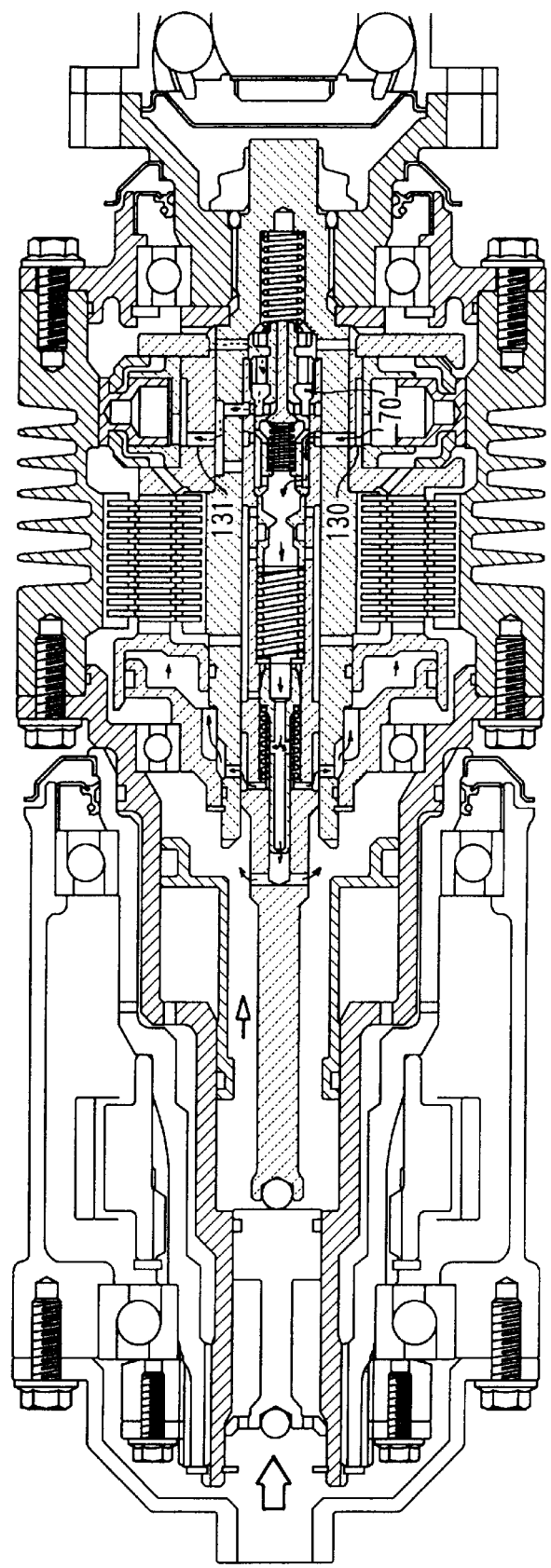
Figure 12:
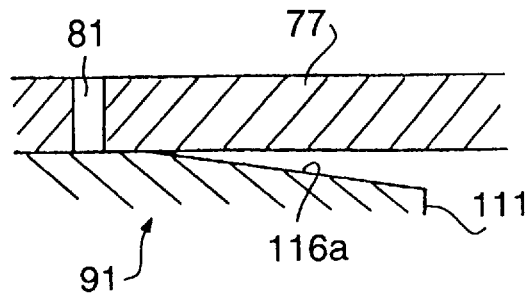
Figure 13A:
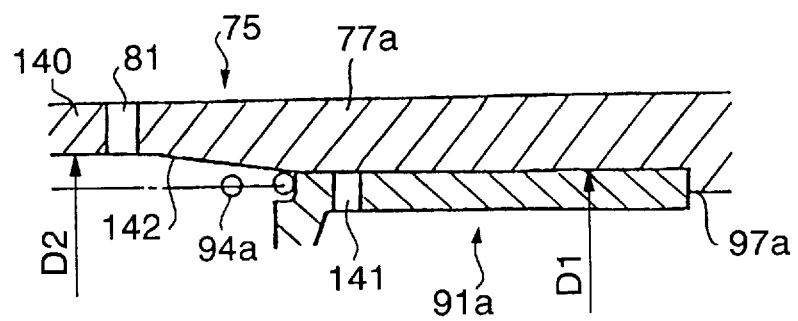
Figure 13B:
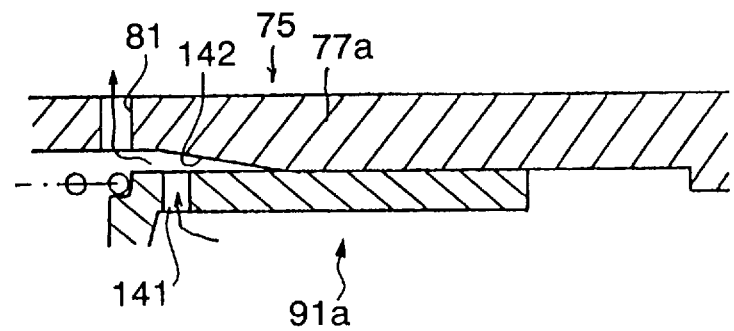
Figure 14:
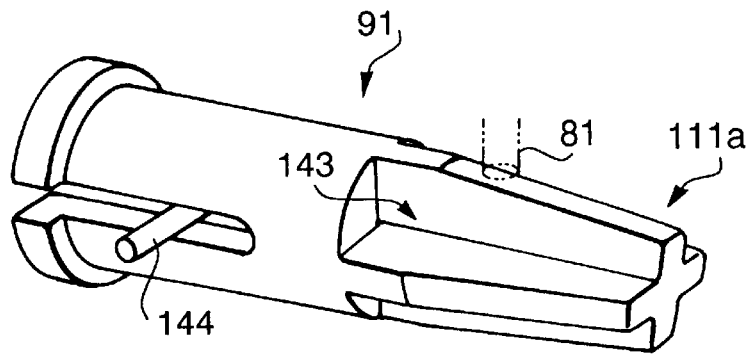
Figure 15:
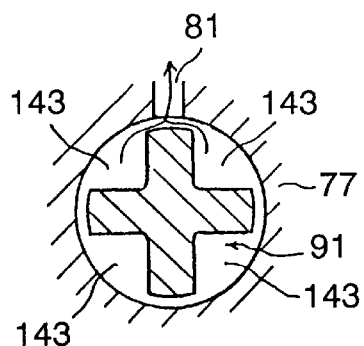
Figure 16:
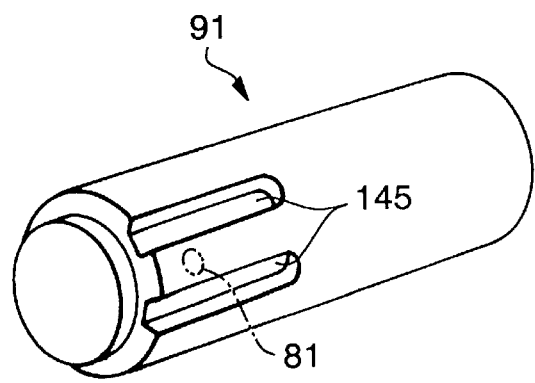
Figure 19:
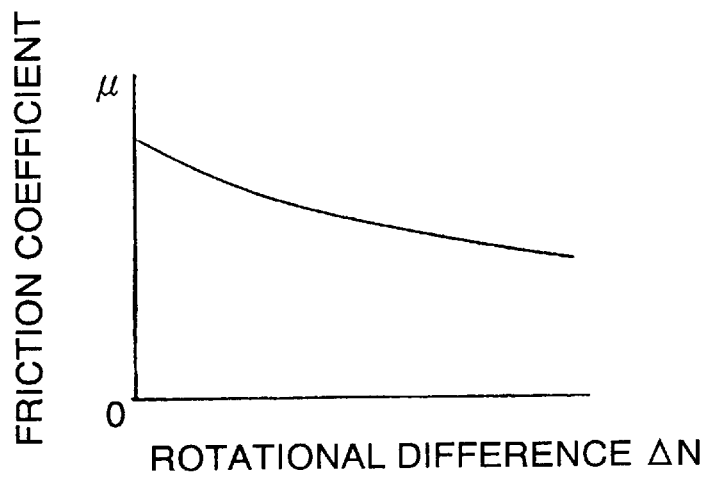
Figure 20:
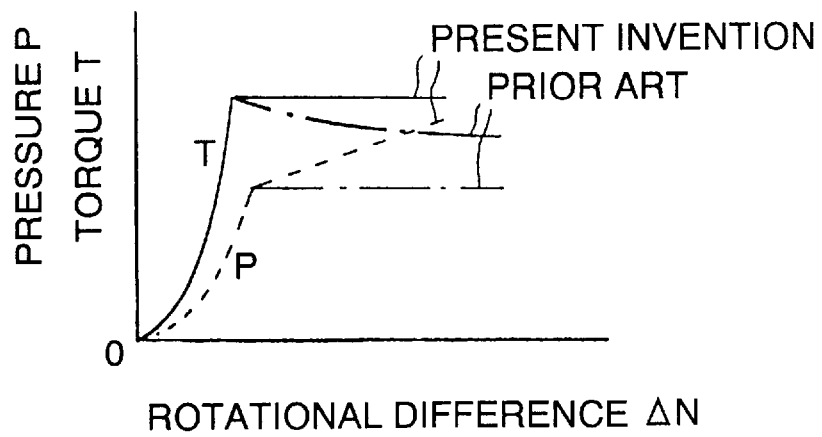
Figure 21:
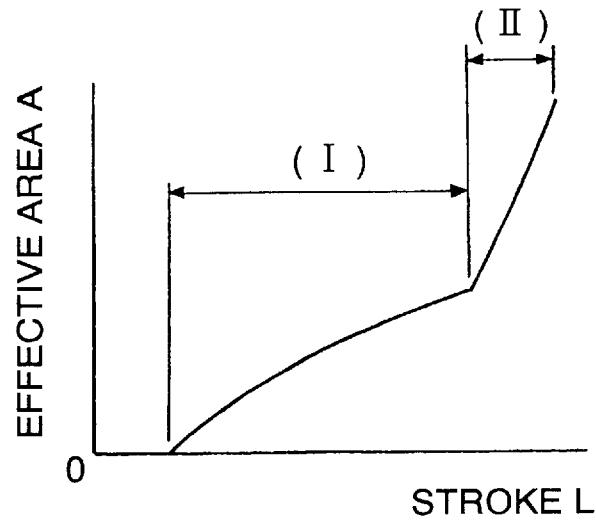
Figure 22:
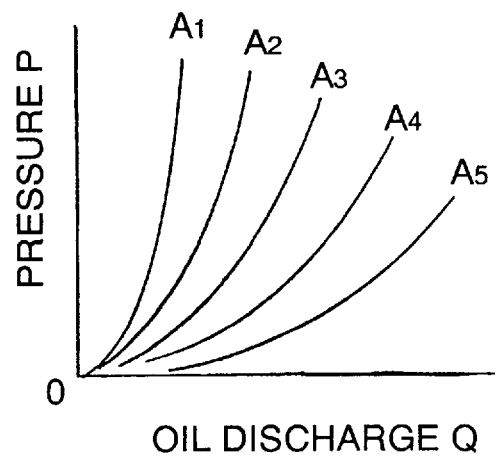
Figure 23:
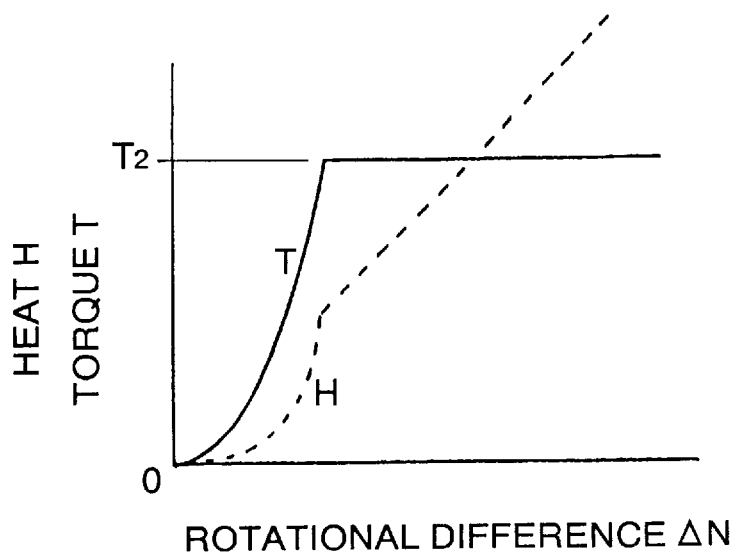
Figure 24:
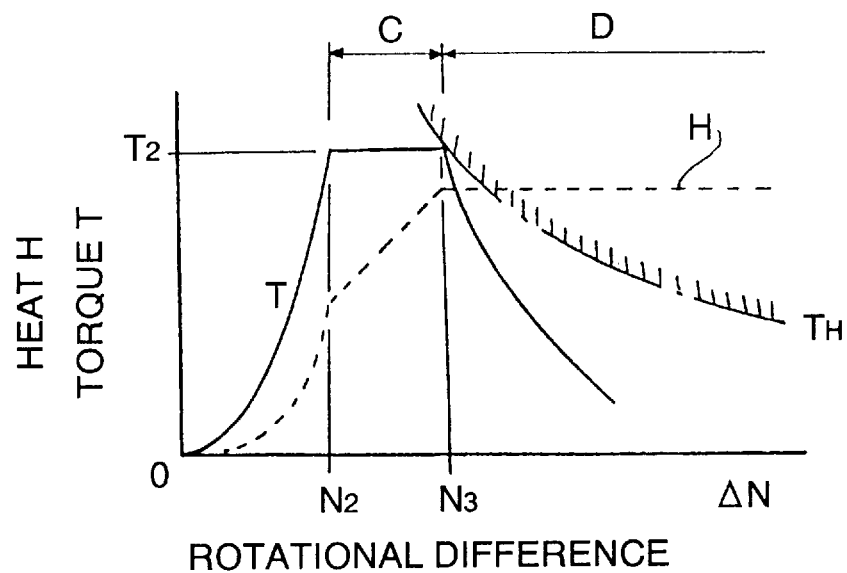

FIGS. 7A–7C illustrate enlarged front sectional views of a first valve body and associated parts provided in the coupling arrangement shown in FIG. 1 respectively, and particularly FIG. 7A illustrates the position of the first valve body when the rotational difference between the front and rear wheels is relatively small, FIG. 7B illustrates the first valve body when the rotational difference becomes greater and FIG. 7C illustrates the first valve body when the rotational difference becomes further greater;

FIG. 8 is an illustration similar to FIG. 1 and especially shows routes for the working oil when the rotational difference between the front and rear wheels is relatively large (zones B and C in FIG. 17);

FIG. 9 is also similar to FIG. 1 and especially illustrates routes for the working oil when the rotational difference is very large (zone D in FIG. 17);

FIG. 10 is also similar to FIG. 1 and especially illustrates routes for the working oil when the rotational difference is negative (zone E in FIG. 17);

FIG. 11 is also similar to FIG. 1 and especially illustrates routes for the working oil when the vehicle moves backward;

FIG. 12 illustrates a modification of the first valve body;

FIGS. 13A and 13B illustrate another modification of the first valve body, and particularly FIG. 13A shows the position of the modified first valve body when the rotational difference between the front and rear wheels is relatively small and FIG. 13B shows the position when the rotational difference is relatively large;

FIG. 14 is a perspective view of the first valve body according to still another embodiment of the present invention;

FIG. 15 is a transverse sectional view of the first valve body shown in FIG. 14 to show the flow of the working oil;

FIG. 16 illustrates a perspective view of yet another modification of the first valve body;

FIG. 17 is a graph showing a torque transmission characteristic of the hydraulic coupling arrangement according to the present invention with the vertical axis indicating a torque transmitted to the auxiliary drive wheels and the horizontal axis indicating a rotational difference;

FIG. 18 is a graph showing a torque transmission characteristic of a conventional viscous coupling arrangement with the vertical axis indicating the torque and the horizontal axis indicating the rotational difference;

FIG. 19 is a graph illustrating a friction coefficient ("mu") characteristic of a multi-disc clutch with the vertical axis indicating the "mu" and the horizontal axis indicating the rotational difference;

FIG. 20 is a graph showing relationship between an oil pressure applied to the clutch and the rotational difference and relationship between the transmitted torque and the rotational difference;

FIG. 21 is a graph illustrating relationship between a stroke of the first valve body and an effective area of a relevant oil port;

FIG. 22 is a graph illustrating relationship between an amount of oil discharge from the hydraulic pump and an oil pressure applied to the clutch with the effective area being the parameter;

FIG. 23 is a graph illustrating relationship between the transmitted torque and the rotational difference and that between heat generation and the rotational difference; and FIG. 24 is also a graph illustrating relationship between the transmitted torque and the rotational difference and that between heat generation and the rotational difference.

DETAILED DESCRIPTION OF THE PREFERRED EMBODIMENTS

Now, preferred embodiments of the present invention will be described in reference to the accompanying drawings. It should be noted that same or similar reference numerals are assigned to same or similar components in the different drawings.

Figure 3:
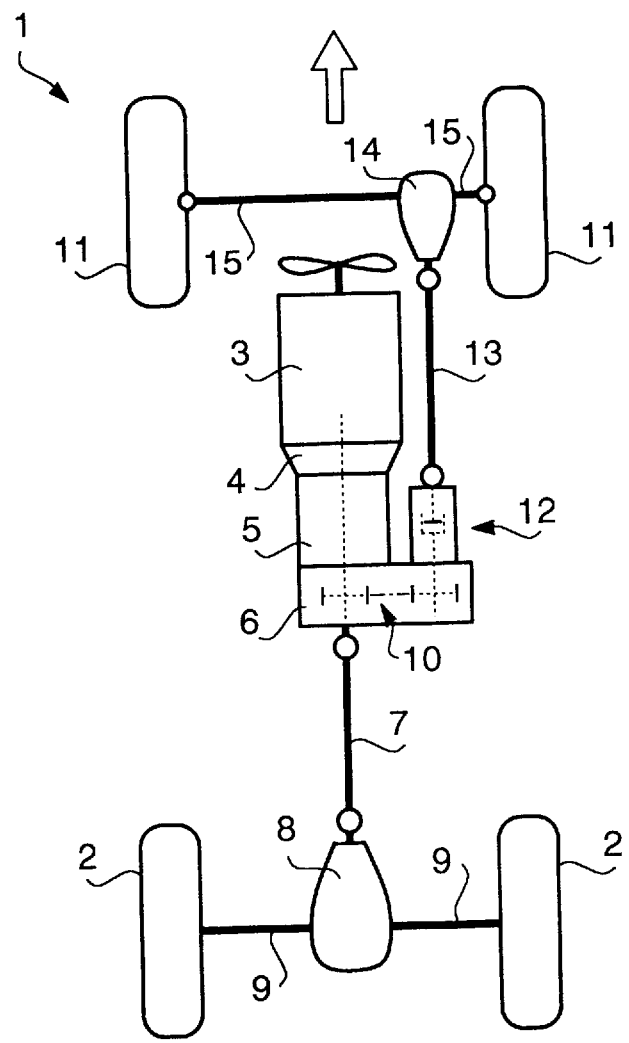
FIG. 3 illustrates a schematic structure of the vehicle which is equipped with the hydraulic coupling arrangement shown in FIG. 1.

Referring first to FIG. 3, illustrated is a schematic overall structure of a vehicle 1 which is provided with a differential-responsive hydraulic coupling arrangement 12 of the present invention. As understood from this illustration, the vehicle 1 is a 4WD vehicle of which rear two wheels 2 are used as main or primary drive wheels. Also, this vehicle is a FR (front-engine and rear-drive) type vehicle. A drive power generated by an engine 3 is transmitted to a transfer 6 through a clutch 4 and a transmission 5, and in turn to the rear wheels 2 via a rear wheel propeller shaft 7, a differential 8 and associated rear wheel drive shafts 9. The power transmission line from the engine 3 to the right and left rear wheels 2 is a direct connection line so that the drive power is always transferred to the rear wheels 2.

The transfer 6 has a chain mechanism 10 therein such that part of the drive power from the engine 3 is imparted to drive auxiliary drive wheels (front wheels) 11. However, this drive power is only selectively transmitted to the front wheels 11 by the hydraulic coupling arrangement 12 mounted on the transfer 6 (will be described more in detail later). When the drive power is output from the hydraulic coupling arrangement 12, the drive power is transferred to the right and left front wheels 11 via a front wheel propeller shaft 13, a front wheel differential 14 and right and left front wheel drive shafts 15. In this manner, the front wheels 11 are used as secondary drive wheels which are selectively actuated according to a running condition of the vehicle 1. It should be noted that the front wheels 11 are utilized for steering when the vehicle 1 is in a 2WD mode and that the chain mechanism 10 may be replaced by a gear mechanism or belt mechanism. The unshaded arrow in FIG. 3 indicates a forward direction.

Figure 2:
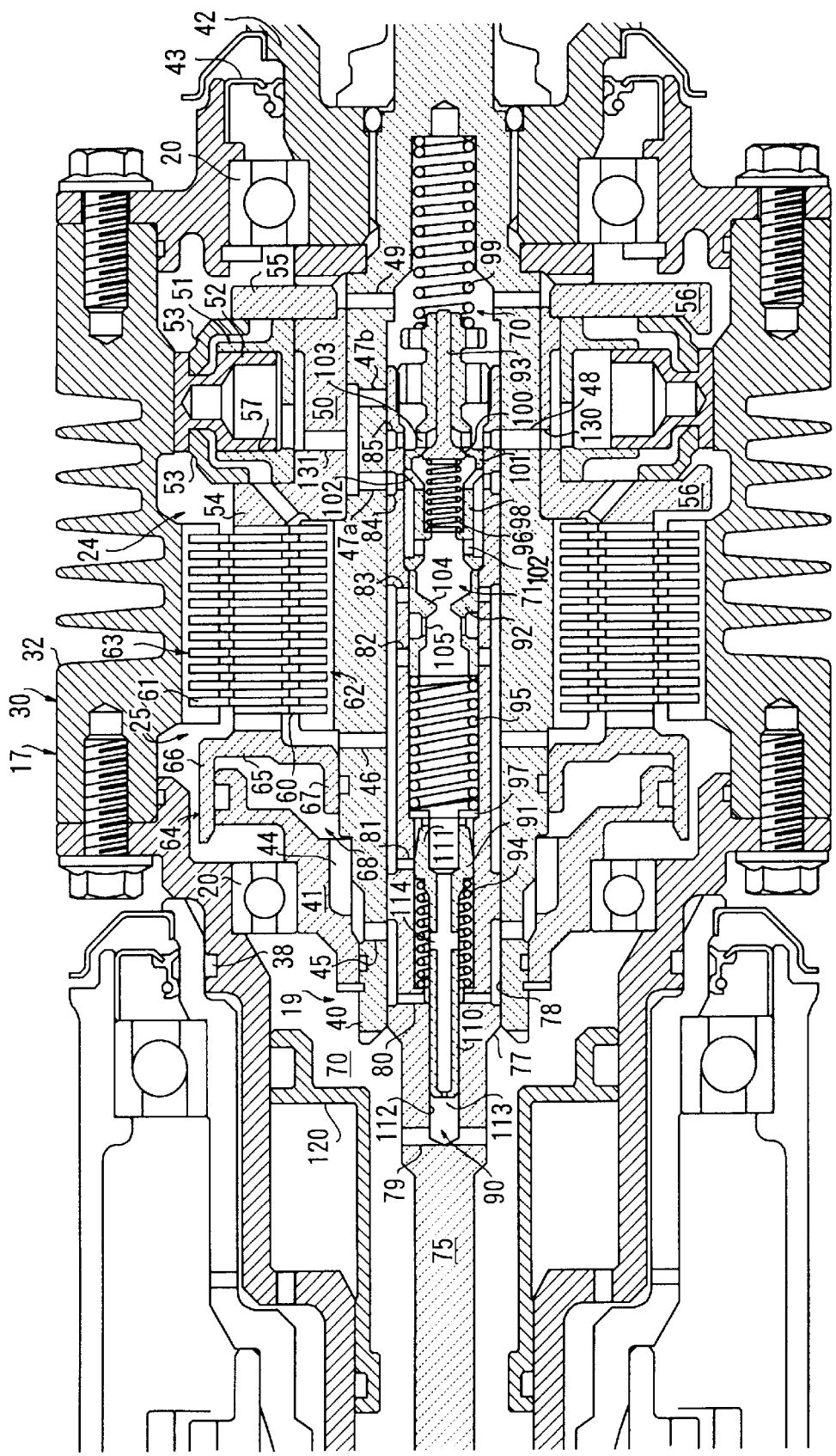
FIG. 2 is an enlarged view of a major part of the cross section shown in FIG. 1.

Referring now to FIG. 1, illustrated is a detail of the hydraulic coupling arrangement 12 in cross section. FIG. 2 shows a major portion of the cross section shown in FIG. 1 in an enlarged scale.

As illustrated in FIG. 1, the hydraulic coupling arrangement 12 has a compact and generally cylindrical shape. The coupling arrangement 12 includes a transfer casing 16, a first hollow rotary shaft 17 journally supported in the transfer casing 16 via a set of bearings 18, and a second rotary shaft 19 extending in the first rotary shaft 17. The second shaft 19 is journally supported in the first shaft 17 by a set of bearings 20. The first and second rotary shafts 17 and 19 are coaxial and rotatable relative to each other. Thus, these two shafts form a double-shaft construction. The first rotary shaft 17 is driven together with (or in the associated manner with) the rear wheels 2 since the drive power of the engine 3 is transmitted to the first rotary shaft 17 through a chain 21 and a sprocket 22 of the chain mechanism 10 in the transfer casing 16. On the other hand, the second rotary shaft 19 is coupled with the front wheel propeller shaft 13 via an universal coupling 23 so that it is driven together with the front wheels 11.

Although it will be described in depth later, the first and second rotary shafts 17 and 19 are rotated at the same speed in the same direction and no rotational difference occurs when the vehicle 1 runs under a normal circumstance. However, if the vehicle 1 runs on a snowy road and the rear wheels 2 slip due to an excessive drive power applied to the rear wheels 2, the first rotary shaft 17 rotates faster than the second rotary shaft 19 so that a rotational difference is produced. The hydraulic coupling arrangement 12 utilizes this rotational difference to actuate a hydraulic pump 24 and the oil pressure generated by the pump 24 is used to couple a clutch 25. Upon coupling of the clutch 25, part of the drive power of the engine 3 is distributed to the front wheels 11 so that the drive mode of the vehicle 1 is switched to 4WD from 2WD (FR). In other words, if there is no rotational difference between the front and rear wheels, the hydraulic pump 24 is not activated and the clutch 25 is not engaged so that the vehicle 1 is operated in a 2WD mode. In this manner, the vehicle 1 is operated in a 2WD mode under a normal condition so that a friction related to actuation of the front wheels is not generated and the fuel consumption efficiency is high, and the vehicle 1 is automatically switched into a 4WD mode only when required. Therefore, manipulation is easy and safety is insured.

Now, the structure of the hydraulic coupling arrangement 12 of the invention will be described in detail.

The first rotary shaft 17 includes a cylindrical housing 30 and a hollow shaft portion 31 fitted over the housing 30. An approximate left half 33 has a smaller diameter and received in the transfer casing 16 of the housing and an approximate right half 32 of the housing 30 has a larger diameter and is exposed. The reduced diameter half 33 has a stepwise shape and the left end thereof has the smallest diameter. The hollow shaft portion 31 is fitted over the reduced diameter portion 33 and secured thereon by a key 34. The sprocket 22 is also fixed on the hollow shaft portion 31 by a key (not shown) and the chain 21 is engaged over the sprocket 22. The transfer casing 16 journally supports the hollow shaft portion 31 at longitudinal ends of the hollow shaft portion 31 by a pair of bearings 18 so that the first shaft 17 can rotate about its center axis. At the right end of the transfer casing 16, provided is a seal member 35 which is in slide contact with the hollow shaft portion 31. An opening 36 is formed in the left end face of the transfer casing 16 so that a rod (not shown) can penetrate outward along the center axis of the first shaft 17. The rod opening 36 is necessary for the rod to move right and left in FIG. 1 since it is connected with a shift lever (not shown).

The hollow shaft portion 31 has a stepwise shape which generally corresponds to the stepwise shape of the left half 33 of the housing 30. However, it should be noted that a gap 37 is created between the hollow shaft portion 31 and the left half 33 of the housing 30 except their longitudinal ends. The right end of the left half 33 simply fits in a right end opening of the hollow shaft portion 31. A circumferential groove 38 is formed in an outer surface of the left half 33 near its right end. This groove 38 has a U-shaped cross section and an 0-ring (not shown) is placed in the groove 38. In FIG. 1, similar grooves are formed in other elements and 0-rings (not shown) are also fitted therein. A stop member 39 is mounted on the left end of the hollow shaft portion 31 to prevent falling off of the hollow shaft portion 31.

As illustrated in detail in FIG. 2, the second shaft 19 includes a hollow center shaft portion 40 extending in the right half 32 of the housing 30 of the first shaft 17, a support member 41 secured to the left end of the center shaft portion 40 and a coupling member 42 secured to the right end of the center shaft portion 40. The support member 41 and the coupling member 42 extend radially outward and these members are supported by the associated bearings 20 from outside respectively. The coupling member 42 projects outward in the right direction from the right end opening of the right half 32 of the first shaft 17 and its free end is coupled to the universal coupling 23 (FIG. 1) by bolts (not shown). A seal member 43 is provided at the right end of the right half 32 of the first shaft 17 such that it is in slide contact with the coupling member 42. A plurality of cutout or recessed portions 44 is spacedly formed in an inner surface of the support member 41 at predetermined intervals in a circumferential direction. These recesses 44 are communicated with associated radial hydraulic ports 45 formed in the center shaft portion 40 respectively. Each of the hydraulic ports 45 extends from an outer surface of the center shaft portion 40 to an inner surface of the same. The center shaft portion 40 also has a plurality of similar radial oil ports 46, 47a, 47b, 48 and 49. The hollow center shaft 40 is coaxial to the first shaft 17.

The hydraulic pump 24 is coaxially located in the right half portion 32 of the housing 30 in the right half area. This pump is a radial piston pump of which principle is disclosed in Japanese Patent Application, Publication No. 8-135562 owned by the assignee, the entire disclosure thereof is incorporated herein by reference. Fundamental structure and operation of the radial piston pump will be described with reference to FIGS. 4 and 5.

Figure 4:
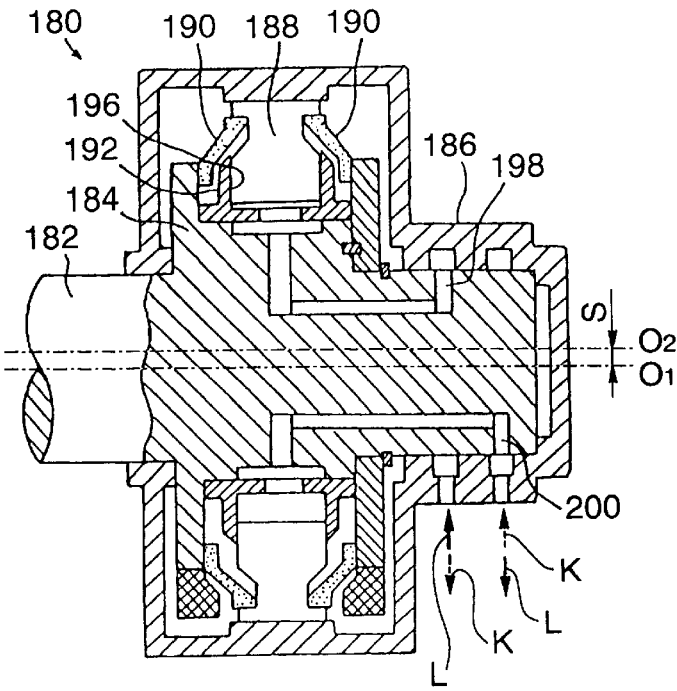
FIG. 4 illustrates a front sectional view of a hydraulic pump of the same type as used in the hydraulic coupling arrangement of the invention.
Figure 5:
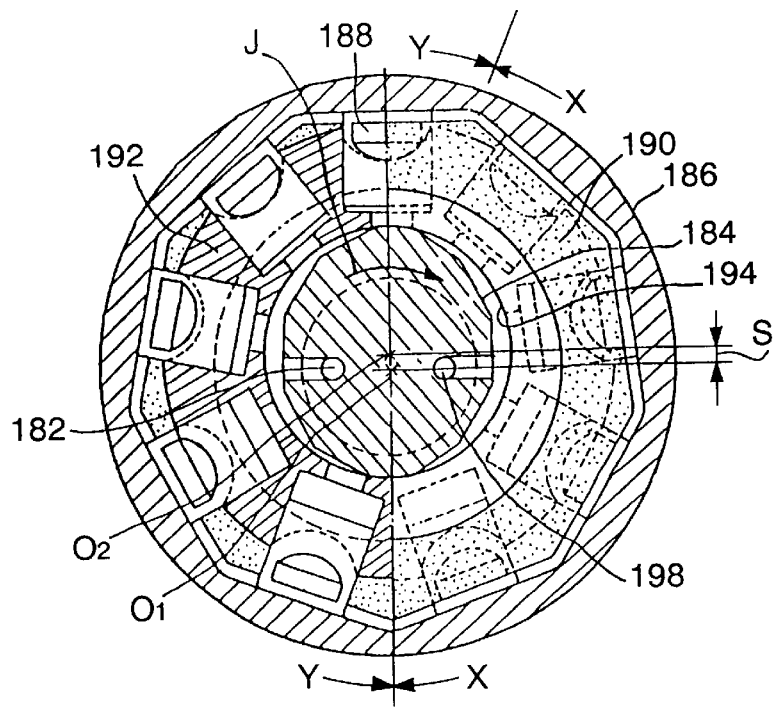
FIG. 5 depicts a transversal sectional view of the hydraulic pump shown in FIG. 4.
Figure 6:
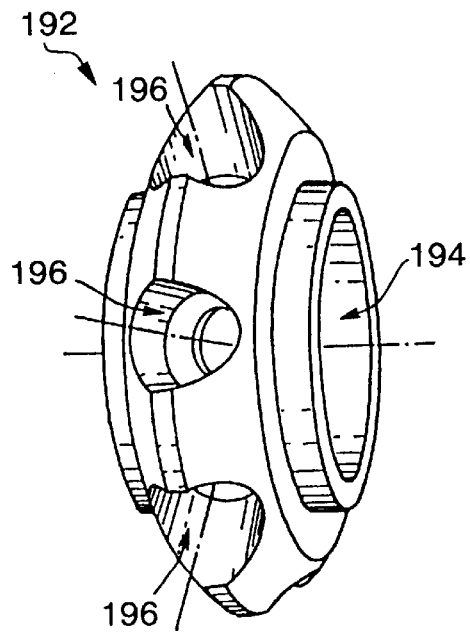
FIG. 6 illustrates a perspective view of a cylinder ring used in the hydraulic pump shown in FIG. 4.

Referring to FIG. 4 which illustrates a front sectional view of the radial piston pump 180, the radial piston pump 180 has a rotary shaft 182 and an eccentric portion 184. The eccentric portion 184 is an integral part of the rotary shaft 182. The line 01 indicates the center line of the rotary shaft 182 and the line 02 indicates the center line of the eccentric portion 184. The line 02 is offset from the line 01 by a distance S. A pump housing 186 is fitted over the rotary shaft 182 in such a manner that the rotary shaft 182 can rotate relative to the pump housing 186. As shown in FIG. 5 which illustrates a transverse cross section of the radial piston pump 180, the inner wall of the pump housing 186 is a regular polygon in its cross section and the outer wall of the eccentric portion 184 is also a regular polygon in its cross section. A plurality of pistons 188 is radially provided in the pump housing 186 and forced to the inner wall of the pump housing 186 at flat portions of the inner wall by a pair of rings 190 (FIG. 4). A cylinder ring 192 (FIG. 6) is fitted on the eccentric portion 184 such that it can rotate relative to the eccentric portion 184 while it is being in slide contact with the eccentric portion 184. The cylinder ring 192 has a center opening 194 for receiving the eccentric portion 184. The cylinder ring 192 also has a plurality of radial recesses or holes 196 which serve as cylinders for slidably receiving the pistons 188 respectively. As the pistons 188 are placed in the associated cylinders 196 and the cylinder ring 192 is fitted on the eccentric portion 184, the cylinder ring 192 is not rotatable relative to the pump housing 186.

If the pump housing 186 is fixed and the rotary shaft 182 rotates in the direction as indicated by the arrow J about the center axis 01 of the shaft 182 and the eccentric portion 184 rotates about its center axis 02 upon rotation of the shaft 182, then the cylinder ring 192 only moves in a radial direction and performs an eccentric rotational motion. This causes the radial cylinder holes 196 to move relative to the associated pistons 188 in turn in the clockwise direction. As a result, the free volumes (or oil receiving spaces) in the cylinder holes 196 change and the working oil is pushed out of and drawn into the cylinder holes 196 in turn in the clockwise direction. In the situation shown in FIG. 5, the oil in the cylinder holes 196 in the area X will be forced out as the shaft 182 further rotates clockwise. The working oil will be discharged from a port 198. On the other hand, the free spaces in the cylinder holes 196 in the area Y will receive the working fluid. The working fluid is drawn from another port 200. In FIG. 4, the working fluid flows as indicated by a pair of opposite broken-line arrows K.

If the shaft 182 rotates counterclockwise in FIG. 5, the range X now indicates the suction area and the range Y indicates the discharge area. In this case, the working oil flows in the directions as specified by the solid-line arrows L in FIG. 4.

If the pump housing 186 is rotatably supported by a certain structure from outside, the same effect as described above can be obtained as long as there is a relative rotation difference between the pump housing 186 and the rotary shaft 182. In other words, the radial piston pump 180 is a pump which produces an oil pressure as it is activated by rotational difference between the rotary shaft 182 and the pump housing 186. Accordingly, if there is no rotational difference or the shaft 182 and the pump housing 186 rotate together, the hydraulic pump 180 is in a deactivated condition and no oil pressure is generated.

Referring to FIGS. 4 and 5 as well as FIG. 2 illustrating the hydraulic pump 24 which is constructed under the same concept of the radial piston pump shown in FIGS. 4 and 5, the center shaft 40 in FIG. 2 corresponds to the rotary shaft 182 in FIG. 4, the right half portion 32 corresponds to the pump housing 186, an eccentric ring member 50 press-fitted on the center shaft 40 corresponds to the eccentric portion 184, a cylinder ring 51 fitted on the eccentric ring member 50 corresponds to the cylinder ring 192, pistons 52 received in the cylinder ring 51 correspond to the pistons 188 and a pair of rings 53 corresponds to a pair of rings 190.

Referring to FIG. 2, the eccentric ring member 50 has right and left projections 55 and 54 at its right and left ends, and these projections 54 and 55 support the cylinder ring 51 and the rings 53 therebetween so that movement of the rings 51 and 53 in the axial direction of the first shaft 17 is limited. As illustrated in a lower area in FIG. 2, the projections 54 and 55 are provided with balancers 56.

The pistons 52 are radial pistons and the cylinder ring 51 has a plurality of cylinder holes 57 spacedly formed in a circumferential direction thereof like those shown in FIG. 4. The pistons 52 can move reciprocally in the associated cylinder holes 57. Each of the pistons 52 has a hollow structure to reduce its weight. The cylinder ring 51 is rotatable relative to the eccentric ring member 50.

The clutch 25 is a wet multi-disc clutch. Specifically, the clutch 25 includes a plurality of clutch plates 60 and 61 arranged alternately in the axial direction of the first rotary shaft 17. The inner clutch plates 60 are attached to the center shaft 40 via a spline 62 and the outer clutch plates 61 are attached to the right half 32 of the housing 30 via another spline 63 so that the clutch plates 60 and 61 are movable in the axial direction of the first rotary shaft 17 and not movable in the circumferential direction.

On the left side of the clutch discs 60 and 61, provided is a hydraulic piston 64 for engaging/disengaging the clutch discs 60 and 61 with/from each other. The hydraulic piston 64 has a 90-degree left turned U-shaped cross section as illustrated and the oil pressure works on its inner vertical surface 65. The inner surface of a peripheral wall 66 of the piston 64 slidably contacts the free ends of the support member 41 extending generally radially in the piston 64. A boss 67 of the piston 64 slidably fits over the center shaft 40. Although will be described in detail, this structure prevents leakage of the oil pressure acting on the effective surface 65 and creates an oil pressure chamber 68 on the left side of the effective surface 65.

If the oil pressure is applied onto the effective surface 65 of the hydraulic piston 64, the hydraulic piston 64 is pushed to the right so that the clutch discs 60 and 61 are coupled with each other. This is the engagement of the clutch 25. When there is no oil pressure acting on the surface 65, the clutch discs 60 and 61 are released from the engaged condition and the clutch 25 is brought into the disengaged or disconnected condition.

The working fluid of low or atmospheric pressure has been charged into the hydraulic coupling arrangement 12 under a sealed condition. The hydraulic fluid is drawn into the oil pump 24, its pressure is raised therein and discharged therefrom. The pressurized oil is then used to push the hydraulic piston 64 so as to engage the clutch 25. Therefore, the housing 30 defines an oil chamber 70 for storing the working oil which will be delivered to the hydraulic pump 24, and the oil pressure generated by the hydraulic pump 24 is forced to flow toward the clutch 25 through an oil passage 71 formed in the center shaft 40 along the center line of the center shaft 40.

Referring back to FIG. 1, the left end of the housing 30 (or the free end of the left half section 33) has an opening closed oil-tightly by a piston member 72. The piston member 72 is slidable in a certain range in contact with an inner wall of the left half section 33. The piston member 72 is normally positioned at its leftmost position as illustrated in FIG. 1 and abuts on a stop ring 73. Only when a driver of the vehicle 1 moves a shift lever (not shown) into a reverse position, the piston member 72 is forced to the right by the rod (not shown) connected with the shift lever (see FIG. 11: large unshaded arrow). Numeral 74 designates a ball for connection with the rod.

A control rod 75 is provided on the right side of the piston member 72. The control rod 75 is adapted to always contact the piston member 72 via another ball 76. As shown in FIG. 2, an approximate right half of the control rod 75 is a hollow segment 77 which is slidably received in a center bore 78 of the center shaft 40. It should be noted here that the oil passage 71 extends inside the hollow segment 77, and at the right end of the center bore 78, formed is a plurality of radial oil ports 49 which penetrates the peripheral wall of the center shaft 40 so that the interior of the center shaft 40 communicates with its exterior and the oil chamber 70 is also formed in the center bore 78.

A plurality of radial ports 79 is formed in the peripheral wall of the hollow segment 77 near the left end of the hollow space of the hollow segment 77. Similarly, six groups of radial ports 80 to 85 are formed in the peripheral wall of the hollow segment 77 respectively in turn toward the right end of the hollow segment 77 at various intervals in the axial direction of the control rod 75. The ports 79 to 85 penetrate the peripheral wall of the hollow segment 77 so that the interior of the hollow segment 77 communicates with its exterior. These oil ports 79 to 85 and the above described oil ports 46 to 49 of the center shaft 40 define communication passages between the hydraulic pump 24, oil pressure chamber 68 and oil chamber 70 and the oil passage 71. In the oil passage 71, there are provided various components which constitute in combination an oil pressure adjustment mechanism 90 for appropriately adjusting (lowering) the oil pressure produced by the hydraulic pump 24 and for feeding a desired oil pressure to the clutch 25 (will be described later).

The oil pressure adjustment mechanism 90 includes, from the left in the illustration, a first valve body 91, a second valve body 92 and a third valve body 93. These valve bodies 91 to 93 are biased to the right by first to third springs 94 to 96 respectively. Movement of the first valve body 91 to the right is limited by a stop ring 97. Movement of the second valve body 92 to the right is limited by a control sleeve 98.

The control sleeve 98 is inserted into the right end portion of the hollow segment 77 and forced to the left by a spring 99 so that it is secured in the hollow segment 77. The spring 99 also pushes the control rod 75 and the piston member 72 (FIG. 1) to the left via the control sleeve 98. The third valve body 93 is inserted into the control sleeve 98 such that it can move in the axial direction of the control rod 75, and it normally closes an annular communication port 100 at the midpoint of the control sleeve 98 as depicted in FIG. 2. A peripheral wall 101 of the communication port 100 is positioned between the oil ports 84 and 85. On the right and left sides of the peripheral wall 101, formed are oil ports 102 and 103 penetrating a peripheral wall of the control sleeve 98 so that the interior of the control sleeve 98 communicates with its exterior. It should be noted that the third valve 93 contacting the peripheral wall 101 of the port 100 separates the oil chamber 70 from the oil passage 71.

The second valve body 92 has a tube-like shape which moves in the axial direction of the control rod 75 like a spool valve. The second valve body 92 has a throttled portion 104 defined by an annular inner projection so that an oil pressure can acts on the throttled portion 104 to move the second valve body 92. On the left side of the throttled portion 104, formed is another set of radial ports 105 which penetrates a peripheral wall of the second valve body 92.

The first valve body 91 includes a hollow shaft element 110, and the hollow shaft element 110 has an enlarged portion or head portion 111 at its right end. The hollow shaft element 110 is slidably received in a small diameter bore 112 of the control rod 75. The bore 112 is communicated with the oil chamber 70 at its left end by the radial ports 79. The hollow shaft element 110 also has a very small diameter orifice hole 113 at its left end and a plurality of radial oil ports 114 at its midpoint. The radial oil ports 114 penetrate the peripheral wall of the hollow shaft element 110. The enlarged portion 111 can slide in the axial direction of the control rod 75 while being in contact with the inner wall of the hollow portion 77, and it normally closes the oil port 81 as illustrated.

Referring now to FIG. 7A, depicted is an enlarged cross sectional view of the head portion 111 of the first valve body 91 near its outer periphery together with the over-fitting hollow portion 77 of the control rod 75. As understood from the illustration, the head portion 111 has a flat outer annular surface 115 and an inclined outer annular surface (or tapered surface) 116 next to the flat surface 115. The flat surface 115 contacts the inner wall of the hollow portion 77 in a complete plane-to-plane contact manner. The tapered surface 116 includes a first gently inclined portion 117 on its left half side and a second relatively steep portion 118 on its right half side. In short, the tapered surface 116 has different inclinations (two inclinations in the illustrated embodiment).

Referring back to FIG. 1, the left half 33 of the housing 30 receives a free piston 120 such that the free piston 120 is slidable in the axial direction of the first rotary shaft 17 in contact with the inner wall of the housing 30. The free piston 120 seals the working oil in combination with the housing 30 and the piston member 72, and defines the oil chamber 70. The free piston 120 has a tube shape having a flange-like portion. The inner wall of the free piston 120 defines part of the oil chamber 70. The free piston 120 moves freely upon expansion and shrinkage of the working oil due to temperature variations.

The outer periphery of the free piston 120 and the inner wall of the left half section 33 defines in combination an atmospheric pressure chamber 121. The atmospheric pressure chamber 121 is communicated with the interior of the transfer casing 16 via a communication bore 122 of the left half section 33 and a communication bore 123 of the hollow shaft 31. As described earlier, the transfer unit including the chain mechanism 10 is housed in the transfer casing 16, and therefore the transfer casing 16 serves as an accommodation space 124 which communicates with the atmospheric pressure chamber 121. In particular, the transfer casing 16 is provided with a breezer (not shown) to communicate its interior with its exterior so that both the accommodation space 124 and the atmospheric pressure chamber 121 have the atmospheric pressure. Consequently, the oil chamber 70 is also maintained at the atmospheric pressure.

The atmospheric pressure chamber 121 is a chamber opposed to the oil chamber 70 over the free piston 120 in the housing 30 and the breezer is a communication element for ventilation to the outside.

Now, operations of the hydraulic coupling arrangement 12 having the above described structure will be described.

Referring to FIG. 17, illustrated is a torque transmission characteristic curve of the hydraulic coupling arrangement 12 of the present invention. The horizontal axis indicates the rotational difference delta N between the front and rear wheels 11 and 2 and the vertical axis indicates the torque T transmitted to the front wheels (i.e., auxiliary drive wheels) 11. The rotational difference delta N directly corresponds to the rotational difference between the first and second rotary shafts 17 and 19. Delta N is given by the following equation: delta N=(rotational speed of the rear wheel 2)—(rotational speed of the front wheel 11). Change of delta N results in change of delta Na (Delta Na=(rotational speed of the first rotary shaft 17)—(rotational speed of the second rotary shaft 19)). The transmitted torque T varies with the oil pressure applied to the hydraulic piston 26 of the clutch 25.

As seen in the graph shown in FIG. 17, the torque transmission curve is generally divided into zones A to F. In the zone A, the torque T increases from 0 to T1 in proportion to square of the rotational difference delta N from zero to N1. In the zone B, the torque T likewise rises from T1 to T2 as the rotational difference delta N rises from N1 to N2, but the increase is rather gentle. In the zone C, the torque T is constant at T2 regardless of increase of the rotational difference delta N from N2 to N3. In the zone D, the torque T drops from T2 upon increase of the rotational difference delta N from N3. In the zone F, the rotational difference delta N is negative and the torque T is zero.

The zones A to E will be described in detail below in the alphabetic order.

First, when the rear wheels 2 slip and a very small rotational difference is generated between the front and rear wheels 11 and 2, then the hydraulic coupling arrangement 12 takes the situation shown in FIG. 1 and the working oil flows as indicated by the arrows. It should be noted that the solid-line arrows designate the high pressure oil and the broken-line arrows designate the low pressure oil.

The hydraulic pump 24 draws the low pressure oil from the oil chamber 70 through a first port 130 of the eccentric ring 50 since the first port 130 is communicated with the oil chamber 70 via the radial oil ports 48 and 85. On the other hand, the high pressure oil is discharged from a second port 131 of the pump 24 positioned opposite to the first port 130 and is delivered to the oil passage 71 via the ports 47a and 84. The high pressure working oil moves to the left in the oil passage 71 and reaches the first valve body 91 since other ports are closed. Then, the high pressure oil is forced to flow through the orifice 113, which is the only passage toward the oil chamber 70 from the oil passage 71, and finally reaches the oil chamber 70 via the ports 79.

Due to this movement of the high pressure oil through the orifice 113, the oil is throttled and its pressure on the oil passage 71 side is raised in proportion to square of the flow rate of the oil.

The flow rate of the working oil is proportional to the amount of actuation of the hydraulic pump 24, i.e., the rotational difference delta Na between the first and second rotary shafts 17 and 19. After all, the oil pressure in the oil passage 71 is raised in proportion to square of the rotational difference delta N between the front and rear wheels 11 and 2.

Since the oil passage 71 is communicated with the oil pressure chamber 68 via the ports 114, 80 and 45 and the recessed portions 44, the oil pressure in the oil passage 71 is directly transferred to the oil pressure chamber 68. As a result, the working oil pushes the piston 64 to the right by a force proportional to the pressure of the working oil and the clutch 25 is brought into the engaged condition. In this manner, the torque T rises steeply (i.e., in proportion to square of the rotational difference delta N) in a small rotational difference range in the zone A of FIG. 17.

As understood from the foregoing, the first valve body 91 having the orifice hole 113 is an orifice member which determines the increase characteristic of the oil pressure applied to the clutch 25.

Next, when the slippage between the rear wheels and the road becomes larger and the rotational difference delta N becomes between N1 and N2 (zone B), the hydraulic coupling arrangement 12 takes the situation shown in FIG. 8.

When the oil pressure reaches a value which corresponds to the torque T1, it moves the first valve body 91 to the left against the first spring 94 so that the oil port 81 is opened in a throttled manner as illustrated in FIG. 7B. In this situation, another route for oil discharge is created by the ports 81 and 46 which extends to the oil chamber 70, in addition to the orifice hole 113. Consequently, the total area for the combined oil pressure discharge routes is the sum of the area of the orifice hole 113 and that of a throttled route formed by the oil port 81 and the first valve body 91. As a result, the throttling effect to the oil flowing to the oil chamber 70 is moderated and the increase of the oil pressure applied to the clutch 25 becomes gentle. Thus, the increase of the torque T also becomes gentle.

Referring to FIG. 7B, the above operation will be repeatedly described. As the first valve body 91 is moved to the left, the oil port 81 is opened but the first tapered surface 117 is closely positioned and throttles the entrance of the oil port 81. Since the distance from the entrance of the oil port 81, to the first tapered surface 117 is very small, the oil flows into the port 81 in a throttled manner. Accordingly, the flow rate of the oil flowing through the port 81 is appropriately controlled. In other words, the amount of oil discharge is properly adjusted. When the oil pressure increases due to a larger rotational difference, the first valve body 91 is further pushed to the left and the throttling to the oil port 81 is weakened. A larger amount of oil is allowed to flow through the oil port 81 easily so that the oil discharge corresponding to this rotational difference is attained.

In this manner, the oil port 81 functions as an oil discharge port which is closed and opened by the movements of the first valve body 91. The oil port 81 and the first valve body 91 (particularly, the first tapered surface 117 thereof) form in combination a first relief valve which is opened when the oil pressure generated by the hydraulic pump 24 rises to a first prescribed value corresponding to the rotational difference N1, so as to reduce the increase rate of the oil pressure applied to the clutch 25.

If the rotational difference delta N further increases and the oil pressure increases correspondingly, the first valve body 91 is further translated to the left as depicted in FIG. 7C. In this situation, the oil port 81 is opened and faces the second tapered surface 118. This condition is the zone C of FIG. 17 with the rotational difference delta N being between N2 and N3. In the zone C, the force to push the hydraulic piston 64 is further weakened while this force is gradually raised with increase of the rotational difference delta N, so that the clutch engagement force acting on the clutch 25 and the torque T are maintained at constant values respectively (will be described in detail later). The oil flows in the hydraulic coupling arrangement 12 as shown in FIG. 8 in the situation of the zone C.

Since the first tapered surface 117 of the first valve body 91 has a smaller inclination than the second tapered surface 118, the amount of oil discharge upon increase of the oil pressure is smaller when the first tapered surface 117 faces the oil port 81 than when the second tapered surface 118 faces the oil port 81. Therefore, the above described two different characteristics are obtained: the first tapered surface 117 reduces the increase rate of the torque T whereas the second tapered surface 118 determines the uppermost value of the torque T (or attains the torque limiting). It should be noted that the taper surface portion 116 of the first valve body 91 has two kinds of inclinations 117 and 118 in the illustrated embodiment, but it may have more kinds of inclinations and demonstrate more kinds of characteristics.

As described above, the oil port 81 and the first valve body 91 (particularly the second tapered surface 118 thereof) serve in combination as a second relief valve which is opened when the oil pressure generated by the hydraulic pump 24 reaches a second prescribed value corresponding to the rotational difference N2, so as to further reduce the increase rate of the oil pressure applied to the clutch 25.

Next, when the rotational difference delta N exceeds N3 (or falls in the zone D), the situation of the hydraulic coupling arrangement 12 of the invention becomes as illustrated in FIG. 9.

In the above described zones A to C, the working oil discharged from the hydraulic pump 24 flows to the oil passage 71 via the ports 47a and 84 and in turn to the first valve body 91. It should be noted that the second valve body 92 is positioned in this course of flow. Thus, the entire working oil passes through the throttled portion 104 of the second valve body 92.

Accordingly, the oil pressure in the oil passage 71 also has a stepwise profile over the throttled portion 104 of the second valve body 92. Specifically, the oil pressure upstream of the throttled portion 104 (pump side) is lower than that downstream of the throttled portion 104 (first valve body side) due to the throttling effect of the throttled portion 104. This pressure difference is proportional to square of the flow rate of the oil flowing through the throttled portion 104. The pressure difference causes the second valve body 92 to move to the left.

When the leftward propelling force generated by the pressure difference over the throttling element 104 exceeds the rightward biasing force generated by the second spring 95, the second valve body 92 can move to the left against the second spring 95.

The left-shifted position of the second valve body 92 is determined by the left directed pushing force acting on the second valve body 92 exerted by the working oil of when the rotational difference delta N becomes N3, and the amount of shrinkage of the second spring 95. The oil ports 82 are formed at a position to meet the peripheral groove of the second valve body 92 when the second valve body 92 is shifted to the left upon the above mentioned shrinkage of the second spring 95. The second valve body 92 has the ports 105 below the peripheral groove so that the ports 82 are connected with the oil passage 71. Therefore, when the rotational difference delta N becomes N3, still another or third oil discharge route extending from the ports 105 and 82 is created in addition to the orifice hole 113 and the oil port 81. Consequently, the oil pressure starts dropping.

Upon the decrease of the oil pressure, the first spring causes the first valve body 91 to return to the right and the oil port 81 is gradually closed by the first valve body 91. However, the oil pressure applied to the hydraulic piston 64 simply drops upon increase of the rotational difference delta N so that the engaging force acting on the clutch 25 is weakened and the torque T also continues to drop in the zone D where the rotational difference delta N is beyond N3 since the increase of the area (cross section) or oil passage made by the oil ports 82 which is opened upon increase of the rotational difference delta N is significantly greater than the decrease of the area caused by reducing or closing of the port 81. This is because the oil ports 82 have no throttling in its vicinity due to tapered surfaces and the oil is easy to flow through the ports 82 unlike the oil port 81.

As described above, the zone D is a zone where the torque T drops in spite of increasing rotational difference delta N. The torque T should be decreased after the zone C since this large rotational difference is meaningless after having executed a role of maintaining the required maximum torque in the zone C. An unnecessary and excessive heating at the clutch 25 should be prevented in the zone D. The hydraulic pump 24 does not need to function in this zone.

It is preferred that the ports 83 may be formed in such a manner that they connect the oil passage 71 with the oil chamber 70 after initiation of opening the oil ports 82 as the rotational difference delta N further increases and the second valve body 92 further moves to the left. Since the oil ports 82 are provided downstream of the throttling portion 104 of the second valve body 92, the oil pressure generated by the hydraulic pump 24 increases in proportion to square of the rotational difference delta N because of the throttling portion 104 if the rotational difference delta N continues to increase after the oil ports 82 are fully opened and the oil pressure acting on the hydraulic piston 64 once drops. In this situation, if the oil ports 83 are opened, an oil discharge route is created which bypasses the throttling portion 104. This oil escape route not only causes the oil pressure onto the piston 64 to drop but also maintains the oil pressure generated by the oil pump 24 at an extremely low value so that the duration of the oil pump 24 is elongated.

In this manner, the second valve body 92 and the oil ports 82 and 83 form in combination a third relief valve which is opened for reduction of the oil pressure applied to the clutch 25 when the oil pressure produced by the hydraulic pump 24 reaches a third prescribed value corresponding to the rotational difference N3.

Next, the zone E will be described. This zone is a zone in which the rotational difference delta N takes a negative value unlike the foregoing zones A to D, i.e., where the front wheels 11 rotate faster than the rear wheels 2 and the second rotary shaft 19 rotates faster than the first rotary shaft 17. Practically, the zone E represents a situation when the vehicle 1 turns right or left so that the front wheels 11 draw an arc having a larger radius than the rear wheels 2 and the front wheels 11 are forced to rotate faster than the rear wheels 2.

Referring to FIG. 10, the hydraulic pump 24 of the coupling arrangement 12 is rotated in a reverse direction in the zone E. Accordingly, the first lower port 130 becomes the outlet port and the second upper port 131 becomes the inlet port. In short, the roles of these ports are switched.

The working oil discharged from the first port 130 is directed to the oil chamber 70 from the ports 48 and 85.

On the other hand, the working oil flows into the second port (inlet port) 131 from the oil chamber 70 via the orifice hole 113 so that the oil pressure in the oil passage 71 becomes negative due to the throttling effect of the orifice hole 113. As a result, a negative pressure also acts on the hydraulic piston 64 so that the clutch is completely released from the engaged condition and the vehicle 1 is completely brought into the 2WD condition. However, various problems would arise such as cavitation if the working oil has an excessive negative pressure in this hydraulic arrangement. In order to avoid the problems, the third valve body 93 is provided.

Specifically, the oil pressure in the oil passage 71 always acts on the third valve body 93 and the third valve body 93 is forced to the right when this oil pressure is a positive pressure so that the communication port 100 to the oil chamber 70 is completely closed. On the other hand, if the oil pressure in the oil passage 71 becomes a negative pressure, a force for pulling the third valve body 93 toward the left is generated so that the third valve body 93 moves to the left when the leftward force overcomes the rightward force exerted by the third spring 96, and the port 100 is opened.

Therefore, by setting the predetermined spring force of the third spring 96 to be relatively small, the working oil is easily able to flow into the oil passage 71 through the annular port 100 since the port 100 is opened by a very small negative pressure. The opening of the port 100 starts before a large negative pressure is generated in the oil passage 71 even if the rotational difference for reverse rotating the hydraulic pump 24 becomes large. The negative pressure in the oil passage 71 is determined by the orifice hole 113. Accordingly, the cavitation is prevented.

In other words, the third valve body 93 functions as a check valve which connects the oil passage 71 with the oil chamber 70 when it is opened by the negative pressure generated in the oil passage 71 upon drawing of the working oil to the second port 131 from the oil passage 71 while the second rotary shaft 19 is rotating faster than the first rotary shaft 17.

Next, a situation when the vehicle 1 moves backward will be described.

Referring to FIG. 11, when the driver of the vehicle 1 moves the shift lever into the back (or "R") position, the rods and linkages (not shown) are actuated correspondingly so that the piston member 72 and the control rod 75 are moved to the right as indicated by the large unshaded arrow.

Then, the oil ports 48 and 84 are communicated with each other, the first port 130 is communicated with the oil passage 71, the oil port 47b meets the oil port 85 and the second port 131 is communicated with the oil chamber 70. The first and second rotary shafts 17 and 19 are rotated in the reverse direction, and when the first rotary shaft 17 rotates faster than the second rotary shaft 19, the working oil is discharged from the first port 130, i.e., the roles of the first and second ports 130 and 131 are also switched as compared with the vehicle moving forward.

The working oil flows in the same routes as when the vehicle 1 moves forward, and applies a coupling force onto the clutch 25 to change the drive mode of the vehicle 1 into the 4WD mode.

In this manner, the control rod 75 serves as a port switching means for switching the communication condition between the first and second ports 130 and 131 and the oil passage 71 and oil chamber 70 based on the moving direction (forward or rearward) of the vehicle 1.

Now, seven important features of the coupling arrangement 12 of the invention will be described below.

First, the coupling arrangement 12 is characterized by a fact that the first rotary shaft 17, the second rotary shaft 19 and the oil pump 24 are coaxially arranged and the oil passage 71 extends along the mutual center axis of these components.

The oil pressure control mechanism 90 is generally provided in the oil passage 71 as disclosed in Japanese Patent Application, Publication No. 60-252026 and the oil pressure applied to the clutch 25 is adjusted by the oil pressure control mechanism 90, i.e., the torque transmission property is determined by the oil pressure control unit 90.

In the above-mentioned Japanese Publication, however, the oil passage is offset from the center axis of the rotary shaft so that the parts of the oil pressure control unit are affected by a centrifugal force upon rotations. This occasionally results in malfunctioning of the oil pressure control unit and a desired oil pressure control and a desired torque transmission cannot be expected.

According to the present invention, on the other hand, the oil passage 71 extends along the center axis of the rotary shaft so that the oil pressure control unit 90 is not influenced by the centrifugal force even if the rotary shaft rotates at a very high speed. Accordingly, the parts of the oil pressure control unit 90 function appropriately and a stable and accurate torque transmission can be realized.

It should be noted that a fact that the hydraulic pump 24 has the first and second ports 130 and 131 in its inner side for intake and discharge of the oil and a fact that the various oil ports are formed near the center axis of the rotary shaft also contribute to easy installation of the oil passage 71 along the center line of the rotary shaft.

Since the first rotary shaft 17, the second rotary shaft 19 and the hydraulic pump 24 are provided coaxially, the hydraulic coupling arrangement 12 can be designed to be compact as a whole.

A second feature of the hydraulic coupling arrangement 12 of the invention lies in that the transmitted torque T is proportional to square of the rotational difference delta N due to provision of the first valve body 91, and when the torque T reaches T1, the torque increase rate is moderated.

Specifically, when the rotational difference delta N is very small (0≦delta N≦N1: zone A in FIG. 17), the torque T is proportional to square of the rotational difference delta N so that the torque transmission to the front wheels 11 is suppressed while the vehicle 1 is running on a general road having a certain concave and convex or making a right or left turn, and therefore heating of the parts related to the torque transmission to the front wheels and deterioration of fuel consumption efficiency due to the friction loss caused by the torque transmission to the front wheels are prevented. When the vehicle 1 turns a corner of the road and the rotational difference delta N is less than zero (delta N<0), the torque T is maintained at substantially zero so that it is possible to avoid the "tight corner braking".

FIG. 18 illustrates a torque transmission property of a conventional viscous coupling arrangement. As illustrated, when the rotational difference delta N is minute, the torque curve rises steeply. In addition, when delta N is smaller than zero (delta N<0), a symmetric torque curve is drawn. This means that when the vehicle runs on an ordinary road having certain projections and recesses and a small rotational difference is generated between the front and rear wheels or when the vehicle turns right or left and the rear wheels proceed along inner tracks as compared with the front wheels, an excessive torque is transmitted to the front wheels (auxiliary drive wheels) and the earlier mentioned problems occur. In FIG. 18, T is generally proportional to (delta N)$^{1/2}$.

The torque transmission property of the coupling arrangement of the invention in the zone A (FIG. 17) is that the torque T is proportional to square of the rotational difference delta N. Thus, only a trace amount of torque T is transmitted in the zone A. On the other hand, when a larger rotational difference is observed or when a large slippage occurs (zone B), a sufficient torque is transmitted.

Therefore, the torque transmitted to the front drive wheels is extremely small in response to a trace amount of rotational difference caused by the ordinary projections and recesses in the road surface when the vehicle cruises on a high friction coefficient ("mu") road so that an enforced tire slippage on such a road which is a general problem of a conventional 4WD vehicle does not occur. Further, when the main drive wheels slip on a low friction coefficient road, a sufficient assisting torque is automatically transmitted to the auxiliary drive wheels. Consequently, an ideal automatic drive mode change to 4WD is realized.

When the main drive wheels slip on a low friction coefficient road, the assist torque transferred to the auxiliary drive wheels increases gradually with increase of the rotational difference (corresponding to the slippage of the main drive wheels) like the curve in the zone B shown in FIG. 17. Consequently, even if another slippage occurs due to the assist torque transmitted to the auxiliary drive wheels, the driver of the vehicle can relatively easily cope with such a slippage by his or her footwork (or ankle movement) to the accelerator pedal. Therefore, this 4WD vehicle 1 is easy to handle.

A third feature of the coupling arrangement 12 of the present invention is that the torque T is maintained at a constant value T2 by the first valve body 91 (zone C).

In the above mentioned Japanese Patent Application, Publication No. 60-252026, the oil pressure is released by the relief valve such that the clutch engagement force or the transmitted torque is maintained to be constant.

However, generally the friction coefficient ("mu") of the multi-disc clutch draws a curve as shown in FIG. 19. Specifically, the friction coefficient gradually drops as the rotational difference delta N increases. As illustrated in FIG. 20, therefore, even if the oil pressure P applied to the clutch is maintained to be constant by the relief valve, the torque T moderately decreases with increase of the rotational difference delta N so that the torque T cannot be maintained to be constant.

To overcome this problem, proposed is a relief valve provided with a so-called override property which raises the oil pressure on the high pressure side (inlet side) as the flow rate through the relief valve rises. By employing such a relief valve, the decrease of the friction coefficient is counter-balanced and the clutch engaging force is maintained constant.

However, the relief valve disclosed in Japanese Patent Application, Publication No. 60-252026 is a poppet valve type one so that a throttling loss is generated if the oil route opened by the relief valve is small. As a result, the oil pressure on the high pressure side increases in proportion to square of the increase of the flow rate through the relief valve. This results in an excessive over-ride and a torque beyond the limit value is transmitted. In order to avoid such a condition, the oil passage made by the fully opened relief valve would be designed to be larger. However, such a modification results in sensitive response of the relief valve. In other words, the oil route formed by the lifted relief valve increases suddenly in response to a valve lifting movement. Thus, in order to obtain a suitable over-ride, the response sensitivity of the relief valve should be moderated by setting a spring constant of the relief spring to be extremely high.

However, if the relief spring having a very high spring constant is employed, variations of the initial setting load of the relief valve become significantly great relative to dimensional tolerances of the surrounding parts and the valve opening pressures also vary considerably. As a result, the accuracy of the torque limiting property itself is deteriorated.

In the present invention, in consideration of the above problem, the first valve body 91 is used as a spool valve-type relief valve which moves in a direction perpendicular to the port 81 so that the first valve body 91 is moved in an axial direction of the rotary shaft and the oil is discharged from the radial port 81. Owing to this structure, even if the oil discharge route made by the fully opened port 81 is large and the spring constant of the first spring 94 which is the relief valve spring is low, the opening speed or rate of the port 81 in response to the oil pressure increase is lowered and variations of the valve opening pressure due to the dimensional tolerances of the associated parts is suppressed or substantially eliminated. Accordingly, an extremely accurate torque limiting operation is realized. It should be noted that the port 81 may be formed to be slant to the center axis of the rotary shaft 17 and it may extend at an angle other than 90 degrees relative to the movement direction of the first valve body 91.

In this invention, further, when the first valve body 91 is opened, the oil port 81 faces the second tapered surface of the first valve body 91 as illustrated in FIG. 7C. As the oil pressure rises, the second tapered surface 118 is shifted to the left and a substantive inlet area of the oil port 81 is enlarged. Thus, the amount of oil discharge (or amount of relief) is appropriately raised. As a result, the amount of working oil discharge gradually increases as the oil pressure increases, and as illustrated in FIG. 20, the oil pressure P is gradually increased as the rotational difference delta N increases so that a suitable over-ride property is obtained and the transmitted torque T is maintained at a constant value.

Since the transmitted torque T is maintained at a constant value and no increase is admitted, a drive mechanism for the front wheels 11 does not need a great rigidity or strength so that it can be designed to be lightweight.

Referring to FIG. 21, depicted is a relationship between the stroke L of the first valve body 91 and an effective area A of the oil port 81. FIG. 22 depicts a relationship between an amount of oil discharge Q from the hydraulic pump 24 and the pressure P acting on the hydraulic piston 64 of the clutch 25.

As shown in FIG. 21, the relief range I by the first tapered surface 117 provides a smaller effective area A than the relief range II by the second tapered surface 118. In addition, the increase rate of the effective area A is also smaller in the range I than in the range II. As understood from FIG. 22, the acting pressure P increases more moderately with the increasing discharge amount of the oil Q if the effective area A increases from A1 to A5. In consideration of these properties, the above described torque transmission property is obtained.

A fourth feature of the coupling arrangement 12 of the invention is that the transmission torque T is caused to drop from the constant value T2 by the second valve body 92 (zone D in FIG. 17).

Specifically, when the torque limiting operation is carried out (i.e., prior to the zone D), an energy of an excessive torque is wasted through the heat exchange such that a substantive torque is suppressed below a certain value (T2). Therefore, a heat is generated in proportion to the product of the transmitted torque (T) multiplied by the rotational difference (delta N).

However, as seen in FIG. 23, if the vehicle driver further depresses the accelerator pedal even after the transmitted torque T reaches the limit torque T2 to raise the rotational difference delta N, the torque transmission is still limited while the rotational difference is increasing. This results in not only meaningless consumption of the fuel but also further generation of the heat H proportional to the rotational difference delta N thereby raising the temperature of the relevant parts abnormally.

In the present invention, when the constant torque T2 is maintained for a predetermined period, then the torque T is forced to drop so that such heating and temperature rise are prevented and the duration of the arrangement is elongated.

Referring to FIG. 24, when the rotational difference delta N is between N2 and N3 (N2≦delta N≦N3: zone C), the heat generation 11 increases with the increasing rotational difference delta N. In the zone D (delta N≧N3), if the heat generation H should be maintained at a constant value which is reached when delta N becomes N3, the torque T is controlled to follow the heat generation limit curve $T_H$. In other words, in order to prevent the abnormal heat generation, the transmitted torque T is controlled not to be more than the heat generation limit torque $T_H$. In this embodiment, the torque T is particularly adjusted below the limit curve $T_H$ (the curve T is drawn below the curve $T_H$) so that the abnormal heat generation and temperature rise are completely prevented. Because of this, the duration of the hydraulic coupling arrangement is extended and safety is insured. Further, the torque T drops from the constant value T2 so that the load to the front wheel drive line is small. This contributes to the weight reduction and the cost reduction.

A fifth feature of the invention lies in the function of the third valve body 93: the vehicle 1 is maintained in a 2WD condition by not allowing the clutch 25 to have the engaged condition when the front wheels 11 rotate faster than the rear wheels 2.

According to the coupling arrangement according to Japanese Patent Application, Publication No. 62-252026, the clutch is brought into the engaged condition to switch the drive mode of the vehicle to 4WD both when the front wheels rotate faster than the rear wheels and when the rear wheels rotate faster than the front wheels.

However, when the rotational speed of the front wheels is greater than that of the rear wheels due to different tracks taken during cornering (rear wheels take an inner track), dragging occurs on the rear wheels so that the tight corner braking phenomenon is observed. This prohibits a smooth cornering movement of the vehicle, degrades maneuverability and lowers the fuel consumption rate.

In the present invention, on the other hand, when the front wheels 11 rotate faster than the rear wheels 2, no drive force is provided to the front wheels 11. This allows free movements of the front wheels 11, prevents the tight corner braking phenomenon, insures smooth cornering and maneuverability and prevents the fuel consumption rate deterioration.

A sixth feature of the invention is that it is feasible to switch the drive mode of the vehicle 1 to 4WD even when the vehicle 1 moves backward by provision of the control rod 75.

When the shift lever is moved to the "R" position by the vehicle driver and the rear wheels 2 are rotated faster than the front wheels 11, the hydraulic pump 24 is actuated in the reverse direction and its inlet and outlet ports are switched to the outlet and inlet ports respectively. According to the conventional arrangement, the coupling arrangement takes a situation shown in FIG. 1 so that the pressure of the discharged oil is immediately transmitted to the low pressure side and the clutch 25 cannot be brought into the engaged condition.

In the present invention, the control rod 75 switches these ports in a manner such that the oil flows as shown in FIG.

11. By this port switching, the pressure of the discharged oil is given to the clutch 25 so that the front wheels 11 are driven by the power from the engine. As a result, the vehicle 1 is set to the 4WD mode when it is moved backward. This is particularly useful when the driver tries to move the vehicle 1 into a garage on a snowy road.

If the front wheels 11 rotate faster than the rear wheels (i.e., when the vehicle makes a turn) while the vehicle 1 is moving backward, the third valve body 93 also opens the port 100 to immediately release the oil pressure so that the drive mode of the vehicle 1 is changed to 2WD and the vehicle 1 can make a smooth turn.

A seventh feature of the coupling arrangement of the present invention is that the atmospheric pressure chamber 121 defined by the free piston 120 is communicated with the accommodation room 124.

The free piston 120 maintains the oil chamber 70 at the atmospheric pressure to cope with thermal expansion and shrinkage of the working oil so that damages to an oil seal or other parts due to increase of the inner pressure are prevented.

However, if the atmospheric pressure chamber 121 is directly opened to the air, and an outer surface of the free piston 120 and an inner wall of the left half section 33 of the housing 30 (particularly the inner wall of the atmospheric pressure chamber 121) are directly exposed to the air, these exposed elements gather rusts and dusts so that a smooth slide movement of the free piston 120 is eventually hindered and the associated oil seals and other parts are damaged.

In the present invention, on the other hand, the external air is not directly introduced into the atmospheric pressure chamber 121 but a mist of lubrication oil having an atmospheric pressure in the accommodation chamber 124 is introduced so that the interior of the atmospheric pressure chamber 121 is properly lubricated and gathering of rusts and adhesion of dusts are prevented. The deterioration of the performances or functions of the free piston 120 is therefore reliably avoided.

As mentioned earlier, the accommodation chamber 124 may be provided with the breezer (not shown) for communication with the outside (external air). In addition, the accommodation chamber 124 may be defined in the transmission housing 5 since the transmission housing 5 can also provide the lubrication oil mist.

The present invention is not limited to the above embodiments. Various modifications and changes may be made without departing from the spirit and scope of the present invention. For instance, as illustrated in FIG. 12, the tapered surface 116a of the first valve body 91 may have only one inclination unlike the one shown in FIG. 7A having two inclinations 117 and 118. By appropriately determining the inclination of the surface 116a, the zone B (zone of gentle torque increase rate) or zone C (zone of constant torque) shown in FIG. 17 is obtained. It should also be noted that the head 111 of the first valve body 91 may have an arbitrary shape as long as that portion of the head 111 which cooperates with the port 81 has a particular inclination.

FIGS. 13A and 13B illustrate another modification. Specifically, the first valve body 91a may have a cylindrical shape having a constant diameter and the hollow shaft portion 77a of the control rod 75 may have two inner diameters D1 and D2 as shown in FIG. 13A. The smaller diameter D1 of the hollow shaft portion 77a is equal to the diameter of the first valve body 91a and the larger diameter D2 of the hollow shaft portion 77a is larger than the first valve body 91a. The small diameter portion is continuous to the large diameter portion 140 and the transit portion is defined by a gentle tapered surface 142. An oil discharge port 141 is formed in the peripheral wall of the first valve body 91a near the left end of the first valve body 91a and the oil discharge port 81 is formed in the thinner peripheral wall 140 of the hollow shaft portion 77a near the tapered surface 142. Normally, the oil port 141 is closed so that there is no oil discharge as depicted in FIG. 13A. The first valve body 91a may be biased to the right by a spring 94a. The right end of the first valve body 91a is stopped by a stepwise hook portion 97a of the hollow shaft section 77a. As the oil pressure rises and the first valve body 91a is forced to the left against the spring 94a as shown in FIG. 13B, the oil port 141 is opened and the oil is allowed to escape through the ports 141 and 81. It should be noted here that the oil port 141 of the first valve body 91a faces the tapered surface 142 and an exit area of the oil port 141 is throttled by the tapered surface 142 in a predetermined manner. As a result, the oil escape is appropriately controlled. Therefore, this modification can demonstrate the same technical effect as in the previous embodiments. It is of course that the tapered surface 142 may have more than one inclination. The rotation of the first valve body 91a relative to the control rod 75 may be prevented by a certain element such as a pin (not shown) extending in a radial direction from the first valve body 91a.

FIG. 14 illustrates still another modification. The head portion 111a of the first valve body 91 which cooperates with the oil port 81 for control of the oil pressure or oil discharge may have four scraped out portions 143 such that the right end face of the head portion 111a may have a + shape. In the previous embodiments except for the one shown in FIGS. 13A and 13B, the head portion 111 of the first valve body 91 has a generally truncated conical shape. However, if the tapered surface defined by the truncated conical shape has a very small inclination, only a trace amount of oil can flow into the port 81 at the very beginning of the port opening movement. This is substantially the orifice which sometimes causes undesired phenomena.

Therefore, the four longitudinal grooves 143 are formed in the head portion 111a of the first valve body 91. As best seen in FIG. 15, the oil can flow into the upper port 81 from the grooves 143 so that the orifice effect is moderated.

As illustrated in FIG. 14, the first valve body 91 have a pin 144 extending in a transverse direction to prevent rotation of the first valve body 91 relative to the control 75.

FIG. 16 depicts a modification of the first valve body 91 shown in FIG. 13. Specifically, a pair of parallel grooves 145 is made in the surface of the first valve body 91 such that the port 81 is positioned between these grooves 145 when the first valve body 91 is moved to such a position. These grooves 145 function in a similar manner as the scraped out portions 143 shown in FIGS. 14 and 15. It should be noted that an element for preventing the rotation of the first valve body 91 relative to the control rod 95 such as a pin 144 shown in FIG. 14 may be attached to the first valve body 91.

What is claimed is:

1. A hydraulic coupling arrangement used in a vehicle having a main drive wheel and an auxiliary drive wheel for imparting a drive power to the main and auxiliary drive wheels based on a rotational difference between the main and auxiliary drive wheels, comprising:

a first rotary shaft coupled to the main drive wheel;

a second rotary shaft coupled to the auxiliary drive wheel;

a hydraulic pump adapted to be driven according to the rotational difference for generating an oil pressure corresponding to the rotational difference;

an oil chamber defined in the hydraulic coupling arrangement;

a clutch for connecting the first rotary shaft with the second rotary shaft based on the oil pressure generated by the hydraulic pump;

a first oil passage extending to the clutch;

first and second ports formed in the hydraulic pump and functioning as inlet and outlet ports or vice versa based on the rotational difference, one port being communicated with the first oil passage and the other port being communicated with the oil chamber; and a check valve which is opened when the second rotary shaft rotates faster than the first rotary shaft, for communicating the first oil passage with the oil chamber so that oil pressure from the hydraulic pump is not applied to the clutch.

2. The hydraulic coupling arrangement of claim 1, further including means for switching the first and second ports based on a rotational direction of the first rotary shaft.

3. The hydraulic coupling arrangement of claim 1, wherein the check valve is opened by a negative pressure generated in the inlet port when the second rotary shaft rotates faster than the first rotary shaft.

4. A hydraulic coupling arrangement used in a vehicle having main drive wheels and auxiliary drive wheels for imparting a drive torque to the main and auxiliary drive wheels based on a rotational difference, the rotational difference being obtained by subtracting a rotational speed of the auxiliary drive wheels from a rotational speed of the main drive wheels, comprising:

a first rotary shaft coupled to the main drive wheels;

a second rotary shaft coupled to the auxiliary drive wheels;

a hydraulic pump adapted to be driven according to the rotational difference for generating an oil pressure corresponding to the rotational difference;

an oil chamber defined in the hydraulic coupling arrangement;

a clutch for connecting the first rotary shaft with the second rotary shaft based on the oil pressure generated by the hydraulic pump;

a first oil passage extending to the clutch; and first and second ports formed in the hydraulic pump and functioning as inlet and outlet ports or vice versa based on the rotational difference, one port being communicated with the first oil passage and the other port being communicated with the oil chamber, and wherein the drive torque transmitted to the auxiliary drive wheels is proportional to the square of the rotational difference when the rotational difference is in a first range, a lower limit of the first range being greater than zero, and the drive torque transmitted to the auxiliary drive wheels is generally proportional to the rotational difference when the rotational difference is in a second range, a lower limit of the second range being greater than an upper limit of the first range.

5. The hydraulic coupling arrangement of claim 4, wherein the vehicle is a 4WD vehicle, and switched to a 4WD drive mode from a 2WD drive mode when the main drive wheels rotate faster than the auxiliary drive wheels.

6. The hydraulic coupling arrangement of claim 4, wherein the hydraulic pump is a radial piston pump.

7. The hydraulic coupling arrangement of claim 4, wherein the clutch is a wet multidisc clutch and has a piston for engaging a plurality of discs of the clutch with each other upon application of the oil pressure from the hydraulic pump.

8. The hydraulic coupling arrangement of claim 7 further including means for applying a negative pressure to the piston when the rotational difference is smaller than zero, and means for preventing the negative pressure from being lower than a predetermined value.

9. The hydraulic coupling arrangement of claim 7 further including valve means for feeding the oil of atmospheric pressure to the first oil passage from the oil chamber when a negative pressure acting on the piston reaches a prescribed value.

10. The hydraulic coupling arrangement of claim 4, wherein the first port is communicated with the first oil passage and the second port is communicated with the oil chamber when the main drive wheels rotate faster than the auxiliary drive wheels.

11. The hydraulic coupling arrangement of claim 4, wherein a center axis of the hydraulic coupling arrangement coincides with a center axis of the hydraulic pump and with a center axis of the clutch.

12. The hydraulic coupling arrangement of claim 4, wherein the drive torque transmitted to the auxiliary drive wheels is constant when the rotational difference is in a third range, and a lower limit of the third range is greater than an upper limit of the second range.

13. The hydraulic coupling arrangement of claim 12, wherein the drive torque transmitted to the auxiliary drive wheels decrease when the rotational difference is in a fourth range, and a lower limit of the fourth range is greater than an upper limit of the third range.

14. The hydraulic coupling arrangement of claim 13, wherein the drive torque transmitted to the auxiliary drive wheels is zero when the rotational difference is not more than zero.

15. The hydraulic coupling arrangement of claim 7 further including a first discharge passage extending to the oil chamber from the first oil passage and an orifice member having an orifice hole and placed in the first discharge passage, and wherein the working oil is forced to flow through the orifice hole of the orifice member before it reaches the oil chamber when the rotational difference is in the first range.

16. The hydraulic coupling arrangement of claim 15 further including a second discharge passage extending to the oil chamber from the first oil passage, and wherein the second discharge passage is opened when the rotational difference is in the second range, so that the working oil flows through the orifice member and the second discharge passage and reaches the oil chamber.

17. The hydraulic coupling arrangement of claim 16 further including a third discharge passage extending to the oil chamber from the first oil passage, and wherein the third discharge passage is opened when the rotational difference is in the third range, and the second discharge passage is also opened when the rotational difference is in the third range, so that the working oil flows through the orifice member as well as the second and third discharge passages and reaches the oil chamber.

18. The hydraulic coupling arrangement of claim 17 further including a fourth discharge passage extending to the oil chamber from the first oil passage, and wherein the fourth discharge passage is opened when the rotational difference is in the fourth range, and the second and third discharge passages are also opened when the rotational difference is in the fourth range, so that the working oil flows through the orifice member as well as the second, third and fourth discharge passages and reaches the oil chamber.

19. The hydraulic coupling arrangement of claim 15 further including a second discharge passage which extends to the oil chamber from the first oil passage and is opened to a first extent when the rotational difference is in the second range.

20. The hydraulic coupling arrangement of claim 19 wherein the second discharge passage is further opened to a second extent when the rotational difference is in the third range.

21. The hydraulic coupling arrangement of claim 20 further including a third discharge passage which extends to the oil chamber from the first oil passage and is opened when the first rotational difference is in the fourth range, and wherein the second discharge passage is also opened to the second extent when the rotational difference is in the fourth range.

22. The hydraulic coupling arrangement of claim 21 further including a second valve member for opening the third discharge passage when the rotational difference is in the fourth range.

23. The hydraulic coupling arrangement of claim 20 further including a first valve member having first and second tapered surfaces for closing the second discharge passage when the rotational difference is in the first range, for opening the second oil passage to the first extent by the first tapered surface when the rotational difference is in the second range and for opening the second oil passage to the second extent by the second tapered surface when the rotational difference is in the third range.

24. The hydraulic coupling arrangement of claim 23, wherein the first valve is a spool valve.

25. The hydraulic coupling arrangement of claim 4, wherein a pressure inside the oil chamber is an atmospheric pressure.

* * * * *